United States Patent [19]

Nakajima et al.

[11] Patent Number: 5,107,483
[45] Date of Patent: Apr. 21, 1992

[54] FREQUENCY SELECTIVE OPTICAL DATA RECORD/REGENERATE APPARATUS

[75] Inventors: Yoshiki Nakajima; Kunimaro Tanaka; Kyosuke Yoshimoto; Motomu Yoshimura; Mitsuo Maeda; Koichi Takeuchi; Kouichi Yamada; Masaharu Ogawa; Kazuhiko Nakane; Hajime Nakajima; Masayoshi Shimamoto; Fumio Matsuda; Minoru Ozaki, all of Amagasaki, Japan

[73] Assignee: Mitsubishi Denki Kabushiki Kaisha, Tokyo, Japan

[21] Appl. No.: 231,881

[22] Filed: Aug. 12, 1988

[30] Foreign Application Priority Data

| Aug. 19, 1987 | [JP] | Japan | 62-206889 |
| Aug. 19, 1987 | [JP] | Japan | 62-206890 |
| Aug. 19, 1987 | [JP] | Japan | 62-206891 |
| Aug. 19, 1987 | [JP] | Japan | 62-206892 |
| Aug. 19, 1987 | [JP] | Japan | 62-206893 |
| Aug. 19, 1987 | [JP] | Japan | 62-206894 |
| Aug. 19, 1987 | [JP] | Japan | 62-206895 |
| Aug. 19, 1987 | [JP] | Japan | 62-206896 |
| Aug. 19, 1987 | [JP] | Japan | 62-206897 |
| Aug. 19, 1987 | [JP] | Japan | 62-206898 |
| Aug. 19, 1987 | [JP] | Japan | 62-206899 |

[51] Int. Cl.$^5$ .............................................. G11B 7/00
[52] U.S. Cl. .................................... 369/108; 365/119
[58] Field of Search ............... 369/100, 32, 44, 109, 369/110, 116, 121, 122, 108, 94, 95, 93, 11; 365/119, 108, 107, 127, 215, 234, 235

[56] References Cited

U.S. PATENT DOCUMENTS

| 3,896,428 | 7/1975 | Szabo | 365/119 |
| 4,090,031 | 5/1978 | Russell | 369/94 |
| 4,101,976 | 7/1978 | Castro et al. | 365/119 |
| 4,103,346 | 7/1978 | Harrer et al. | 365/119 |
| 4,432,083 | 2/1984 | Hsieh et al. | 369/32 |
| 4,562,577 | 12/1985 | Glover et al. | 369/32 |
| 4,583,208 | 4/1986 | Verboom | 369/44 |
| 4,819,210 | 4/1989 | Miura et al. | 369/100 |

Primary Examiner—Donald McElheny, Jr.
Attorney, Agent, or Firm—Wolf, Greenfield & Sacks

[57] ABSTRACT

An apparatus in accordance with the present invention sequentially fixes the wavelength of a light beam irradiated from a light source whose oscillation wavelength sequentially varies to a plurality of different wavelengths to a recording medium to required wavelengths each capable of forming a hole at absorption spectrum of the recording medium, synchronizes timing of change of the wavelength of the light source with timing of recording or regenerating each bit of information, records the optical hole formed in a manner that each bit of information corresponds to the wavelength varying in sequence, and detects the formed hole to regenerate information. Furthermore, the holes formed by the same wavelength are recorded at the positions separated by a distance capable of avoiding interference, while the holes formed by different wavelengths in correspondence to each bit of information are recorded at nearly the same position while that position is slightly displaced at a time, and thereby information is multiple-recorded with high density.

23 Claims, 19 Drawing Sheets

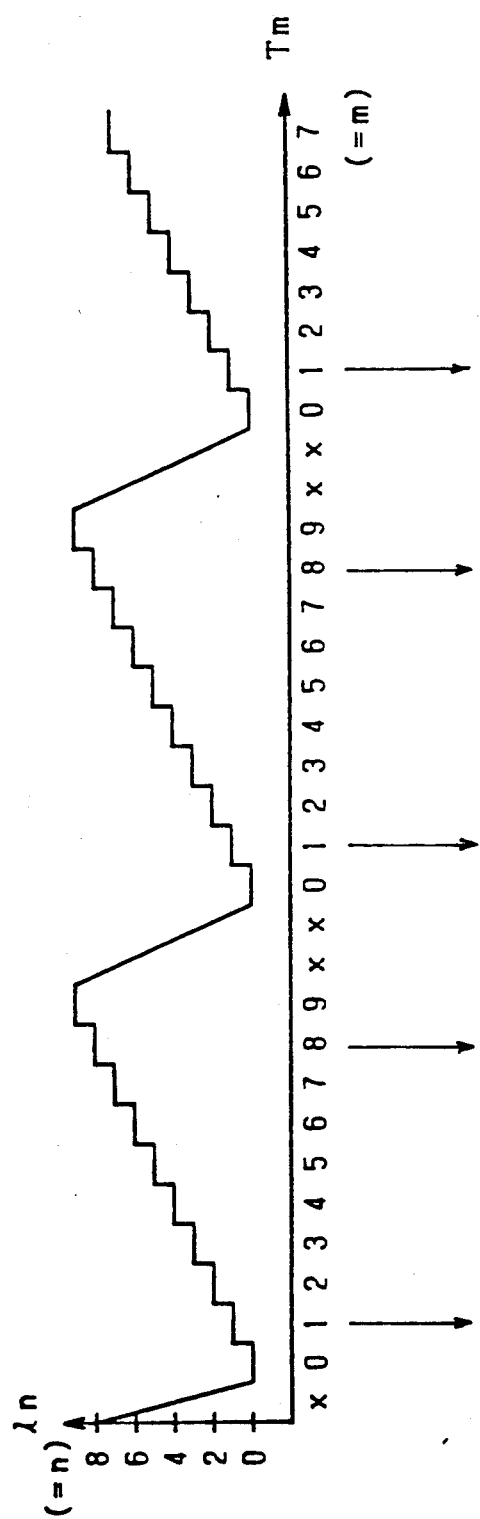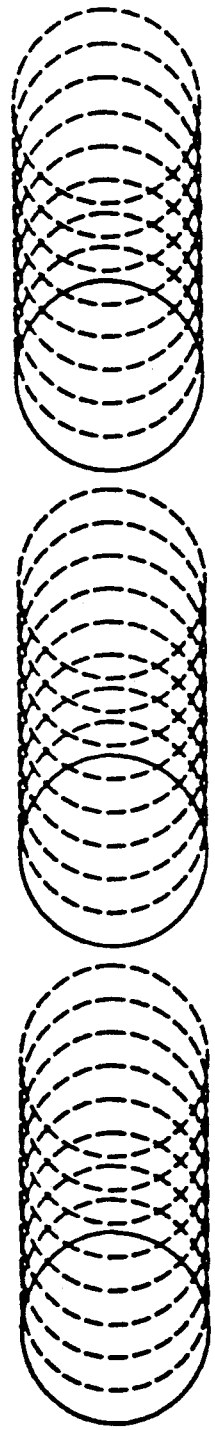
Fig.13(a)
Fig.13(b)

khaving a func
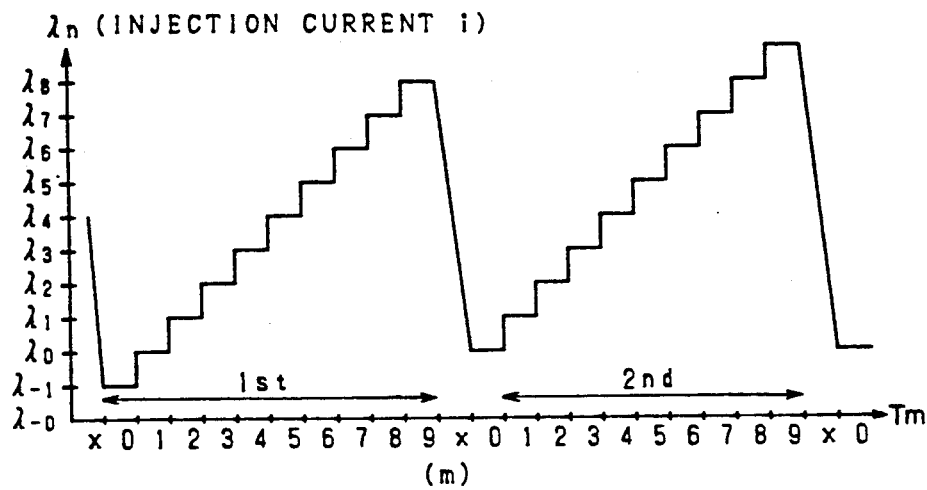
Fig.19(a)
Fig.19(b)
Fig.19(c)
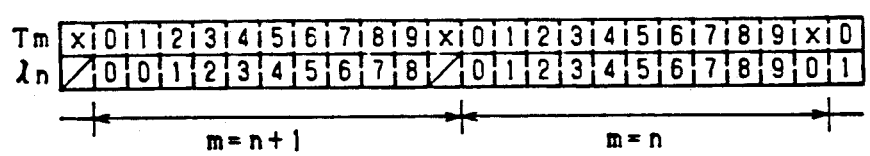
Fig.19(d)
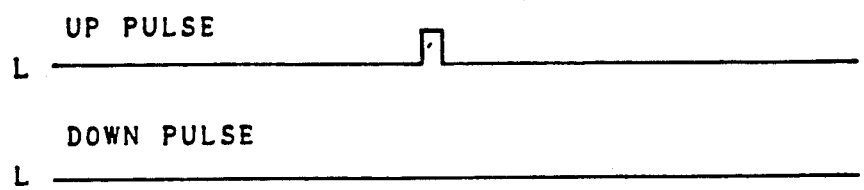
Fig.19(e)

FREQUENCY SELECTIVE OPTICAL DATA RECORD/REGENERATE APPARATUS

BACKGROUND OF THE INVENTION

1. Field of the Invention

The invention relates to a frequency selective optical data record/regenarate apparatus.

2. Description of the Prior Art

FIG. 1 is a block diagram showing a configuration of a conventional frequency selective optical data record/regenerate apparatus, for example, shown in the Japanese Patent Publication No. 51355/1983, and FIG. 2 is a wavelength spectral diagram of a medium wherein information is recorded. As shown in FIG. 1, light emitted from a wave-length-variable light source 81 becomes parallel light by a collimator lens 83, and is deflected in a predetermined direction by an optical deflector 84. Thereafter it becomes a minute light spot by an objective lens 85, and is projected onto a required memory element 87 on a medium 86 having a function of frequency selective optical data record/regenerate, and the light passing through the memory element 87 is detected by a photo detector 88 installed opposite to the light source 81 through the medium 86. The memory element 87 whereto light is to be projected is selected freely by deflecting the light spot by the optical deflector 84. Also, the wavelength of the light source 81 is varied by a wavelength controller 82 of a scanner or the like installed outside the light source 81.

Description is made on the principle of record and regeneration by means of multiple-wave-length system on the basis of FIG. 2. FIG. 2 (a) shows absorption spectra of the medium 86 before multiple-wavelength record, and the medium 86 has a broad spectral characteristic. when light having spectra of light intensity as shown by broken lines in FIG. 2 (a) is projected to this medium 86, dips are produced at the absorption spectra of the projected wavelengths as shown in FIG. 2 (b), and this dip is called a spectral hole (hereinafter referred to simply as hole). When the hole is produced, data "1" is assumed to be recorded at this wavelength, and the place without the hole is assumed as data "0". To form the hole at an arbitrary wavelength (in other words, write data "1"), the wavelength of the light source 81 is tuned by the wavelength controller 82 to the wavelength at which the hole is wanted to be formed, and further the light intensity of the light source 81 is raised to a light intensity required for record. To read a signal from the medium having the spectra multiple-recorded by forming the holes at different wavelengths as shown in FIG. 2 (b), the medium 86 is scanned by the wavelengths covering a wavelength region from A to B, with the light intensity of the light source 81 is kept constant, and thereby since the absorption factor is reduced at the wavelength where the hole is produced as shown in FIG. 2 (b), the photo detector 88 detects the light transmitted through the medium 86, and spectra of light intensity as shown in FIG. 2 (c) is obtained. Accordingly, by scanning the record position while varying at a constant speed the wavelength in the wavelength region used for storage, regeneration signals on a wavelength basis showing presence or absence of the holes are obtained from output of the photo detector 88. Also, if the varying speed of the wavelength is constant, time series regeneration signals of the stored data are obtained as the output of the photo detector 88.

Also, the number of the holes n which can be formed at the absorption spectra of the wavelength region from A to B, is roughly shown by the following equation.

$$n = \frac{1}{2} \cdot \frac{\Delta W_I}{\Delta W_H} \quad (1)$$

In equation (1), $\Delta W_I$ is the band width of absorption spectra and $\Delta W_H$ is the width of one hole. Accordingly, the number of the holes n which can be formed increases with decrease in the value of $\Delta W_H$, and generally the value of $\Delta W_H$ decreases with decrease in temperature, while $\Delta W_I$ is hardly affected by temperature, and therefore the number of holes n which can be formed, in other words, the data storage capacity wherein one hole is equivalent to one bit increases at lower temperatures.

This means that in the conventional frequency selective optical data record/regenerate apparatuses, information recorded by the same wavelength is multiple-recorded on a wavelength basis, and the multiple-recorded information is regenerated by a required single wavelength.

Then, products oscillating reliably at a required wavelength have not been obtained yet by the current level of manufacturing technology for the light source such as semiconductor laser, and the oscillation wavelength is varied also by effects of temperature and the like, and therefore some wavelength controlling means is required to be provided. Accordingly, in the conventional frequency selective optical data record/regenerate apparatuses, the oscillator wavelength is controlled by a controller installed outside the light source, and therefore miniaturization of the optical system is difficult to be realized.

Also, since the controller continuously varies the oscillation wavelength of the laser, each wavelength cannot be separated clearly from the other wavelengths, and thus the problem of low precision of record and regeneration is left unsolved.

SUMMARY OF THE INVENTION

The present invention has been achieved to solve the problems as described above.

A first object of the present invention is to provide a frequency selective optical data record/regenerate apparatus capable of performing optical multiple-record and -regeneration of information corresponding to a change of different wavelength.

A second object of the present invention is to provide a small-sized frequency selective optical data record/regenerate apparatus by means of a light source wherein the wavelength of an irradiating light spot is varied to a different wavelength in response to timing of record or regeneration of information without employing a controller installed outside the light source.

A third object of the present invention is to provide a frequency selective optical data record/regenerate apparatus with high precision of record and regeneration which reliably fixes the wavelength of a light beam irradiating onto a recording medium to a required wavelength.

A fourth object of the present invention is to provide a frequency selective optical data record/regenerate apparatus making record and regeneration in the direction of different wavelengths possible by synchronizing the timing of record or regeneration of each bit of information with the timing of sequential variation of the wavelength of the light beam irradiated from the light source to different wavelengths.

A fifth object of the present invention is to provide a frequency selective optical data record/regenerate apparatus capable of recording and regenerating information in a multiple fashion without stopping at every recording and regenerating an irradiating beam and a recording medium which move relatively.

The above and further objects and features of the invention will more fully be apparent from the following detailed description with accompanying drawings.

BRIEF DESCRIPTION OF THE DRAWINGS

FIGS. 18 and 19(a)-(e) are conceptual views showing the recorded state of information whereto error correcting signs are added.

DESCRIPTION OF THE PREFERRED EMBODIMENTS

Figure 1:
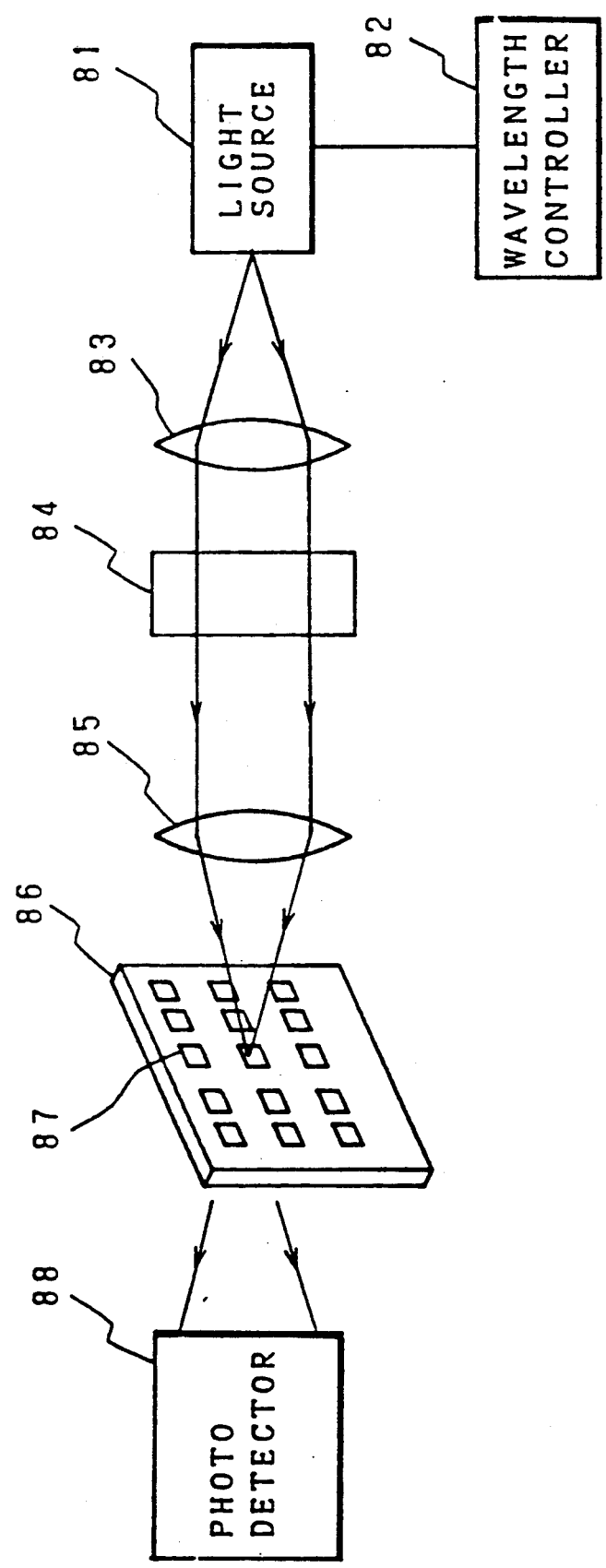
FIG. 1 is a block diagram showing a configuration of a conventional frequency selective optical data record/regenerate apparatus, FIGS. 2, (a)-(c), is a graph explaining the principle of frequency selective optical data record/regenerate.
Figure 2A:
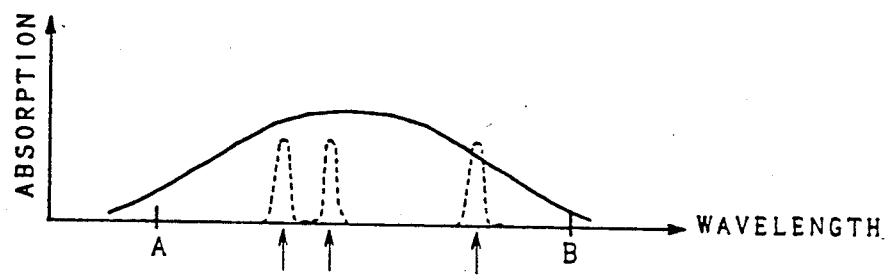
Figure 2B:
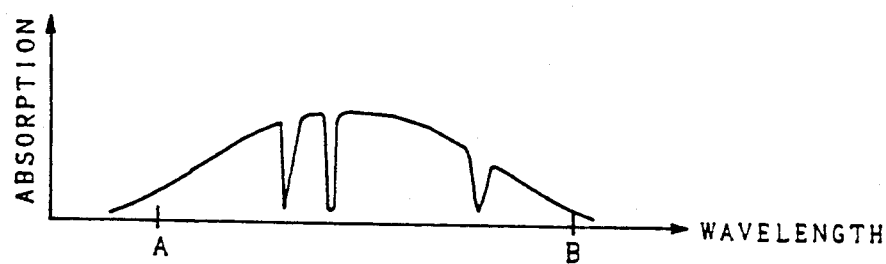
Figure 2C:
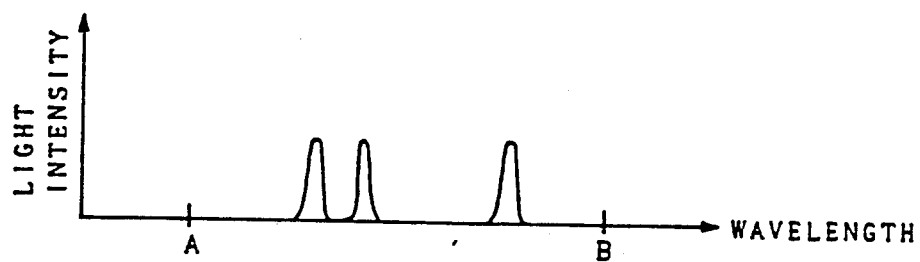
Figure 3:
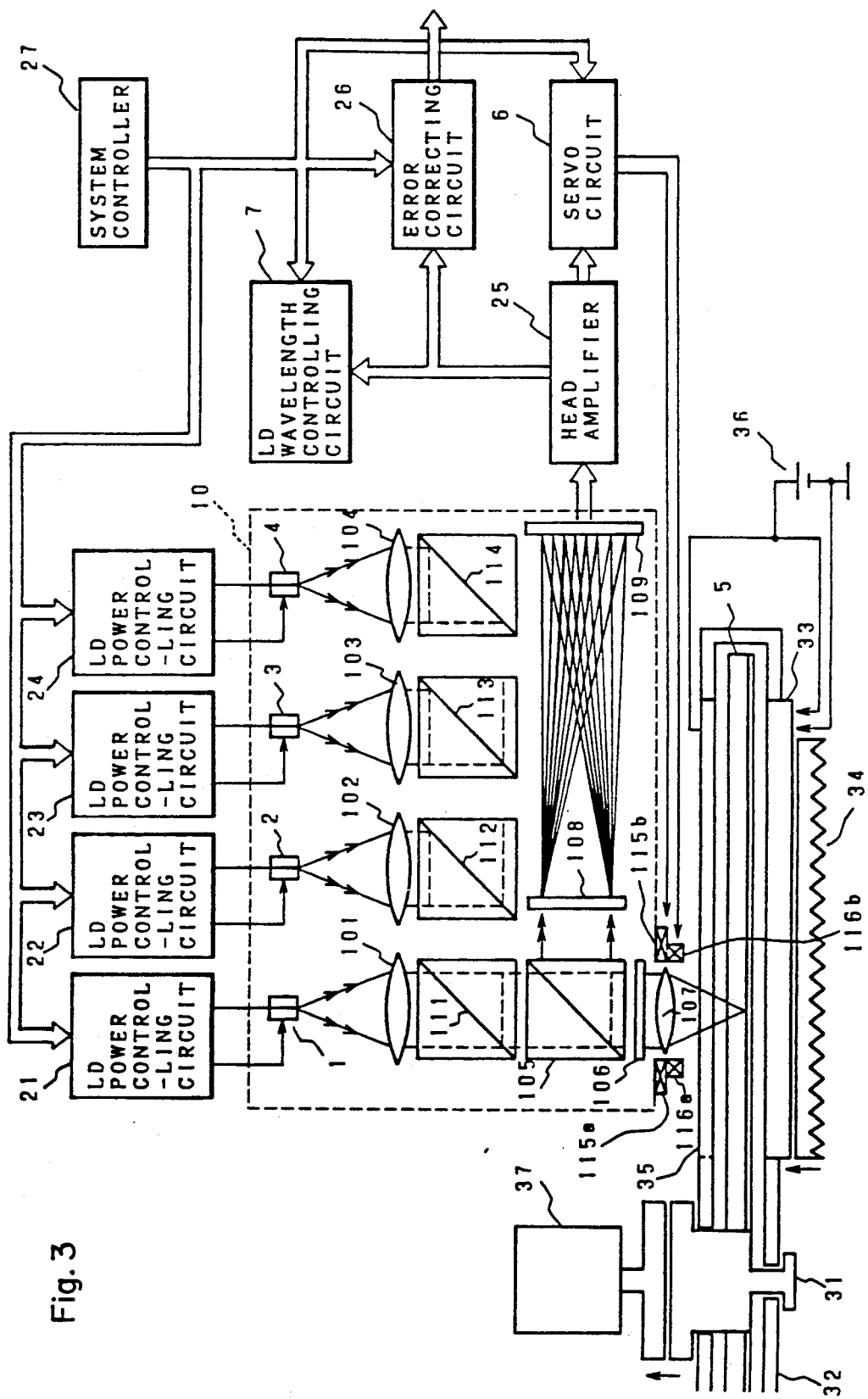
FIG. 3 is a block diagram showing a configuration of a frequency selective optical data record/regenerate apparatus in accordance with the present invention.

Hereinafter, description is made on the present invention on the basis of the drawings showing the embodiments thereof. FIG. 3 is a block diagram showing a configuration of a frequency selective optical data record/regenerate apparatus in accordance with the present invention (hereinafter referred to as an apparatus of the present invention). In FIG. 3, numeral 10 designates an optical head which projects laser light and records and regenerates information, numeral 1 designates a wavelength-variable-type high power semiconductor laser (hereinafter abbreviated as LD1) projecting wavelength-variable laser light for recording and regenerating data, numeral 2 designates a high power semiconductor laser (hereinafter abbreviated as LD2) projecting laser light for erasing data, numeral 3 designates a low power semiconductor laser (hereinafter abbreviated as LD3) projecting laser light for focusing and tracking, and numeral 4 designates a low power semiconductor laser (hereinafter abbreviated as LD4) projecting laser light for focusing. The LD1, LD2, LD3 and LD4 project laser lights belonging to different wavelength bands respectively, and LD power controlling circuits 21, 22, 23 and 24 installed behind the LD1, LD2, LD3 and LD4 control projected laser powers respectively. Also, collimator lenses 101, 102, 103 and 104 shape the projected diffused lights of LD1, LD2, LD3 and LD4 into parallel light respectively, and project it onto dichroic mirrors 111, 112, 113 and 114 respectively.

The dichroic mirror 111 transmits the light of the wavelength band of the LD1, while reflects the light of the other wavelength bands including the wavelength bands of the LD2, LD3 and the LD4, the dichroic mirror 112 reflects the light of the wavelength band of the LD2 and transmits the light of the other wavelength bands including the wavelength bands of the LD3 and LD4, the dichroic mirror 113 reflects the light of the wavelength band of the LD3 and transmits the light of the other wavelengths including the wavelength band of the LD4, and the mirror 114 reflects the light of the wavelength band of the LD4. The light transmitted or reflected by the dichroic mirror 111 plunges into a deflected beam splitter (hereinafter abbreviated as PBS) 105, and the PBS 105 transmits the incident light. The light transmitted through the PBS 105 plunges into a quarter-wave plate 106, and the quarter-wave plate 106 shifts the phase of the light of the wavelength band of the LD1 among the incident light by one-fourth of the center wavelength of that wavelength band, and projects the light onto an objective lens (hereinafter abbreviated as OBL) 107 which is composed of combined lenses or plastic integral lens and whose chromatic aberration is compensated with the phases of the other wavelength bands kept intact, and the OBL 107 condenses the incident parallel light onto a disc 5 as described later. Also, a hologram lens 108 condenses the light reflected from the disc 5 onto different positions in response to the wavelengths, and a photodiode array (hereinafter abbreviated as PD) 109 composed of a plurality of photo defectors detects this condensed light by the respective photo detectors thereof.

Furthermore, actuators for focusing 115a and 115b drive the OBL 107 in the direction of the optical axis, and actuators for tracking 116a and 116b drive the OBL 107 in the direction perpendicular to the optical axis.

Next, description is made on a configuration of a controlling system including a wavelength controlling system of the optical head 10. In FIG. 3, numeral 25 designates a head amplifier, which converts an output current from each photo detector of the above-mentioned PD array 109 into a voltage, and outputs this voltage signal to a servo circuit 6, an LD wavelength controlling circuit 7 and an error correcting circuit 26. The LD wavelength controlling circuit 7 controls the oscillation wavelength of the LD1 on the basis of the voltage signal corresponding to the wavelength of the laser projected from the LD1. The servo circuit 6 drives the actuators for focusing 115a and 115b and the actuators for tracking 116a and 116b on the basis of a voltage signal corresponding to the wavelength of each of the LD3 and the LD4. The error correcting circuit 26 performs error correction of data on a predetermined unit basis, for example, on a byte basis on the basis of a voltage signal corresponding to each wavelength of the LD1. Furthermore, a system controller 27 controls the flow of the whole controlling system controlling record, regeneration, erasure and the like of information.

Next, description is made on a medium wherein information is recorded and a driving apparatus thereof. In FIG. 3, numeral 5 designates a disc having a layer-shaped recording medium which records and regenerates information by forming holes utilizing a photochemical hole burning effect (hereinafter abbreviated as PHB), and a hub 31 wherein the disc 5 is rotated with the center thereof acting as an axis is installed at the center of the disc 5, the hub 31 being provided with a clutch. Also, a cartridge 32 covers the whole disc 5 with a proper space kept, and protects it from exterior, shields light and insulates the disc 5. A liquid crystal shutter 35 transmitting the light irradiated from exterior when loading the disc 5 is installed on one surface of the cartridge 32, and a cooler 33 cooling the interior of the cartridge 32 down to an aimed temperature at which the recording medium can perform the PHB record is installed on the other surface thereof.

A radiator 34 radiating heat from the cooler 33 when loading the disc 5 and a disc motor 37 which is linked to the clutch of the hub 31 and rotates the disc 5 are installed in a driving apparatus of the disc 5. Also, when the disc 5 is loaded in the driving apparatus, a power source 36 supplies the cooler 33, the liquid crystal shutter 35 and the radiator 34 with a voltage or a current.

Description is made on the operation of the apparatus of the present invention having the configuration as described above. When the cartridge 32 incorporating the disc 5 is loaded, the clutch of the hub 31 is linked to the disc motor 37, and the disc 5 starts to rotate.

Furthermore, in the cooler 33, the radiator 34 is loaded, and a current is supplied from the power source 36 to cool the interior of the cartridge 32. On the other hand, the liquid crystal shutter 35 is supplied with a voltage from the power source 36 to be opened, and transmits the light irradiated from the optical head 10, and thereby record, regeneration and erasure are made possible.

Figure 4:
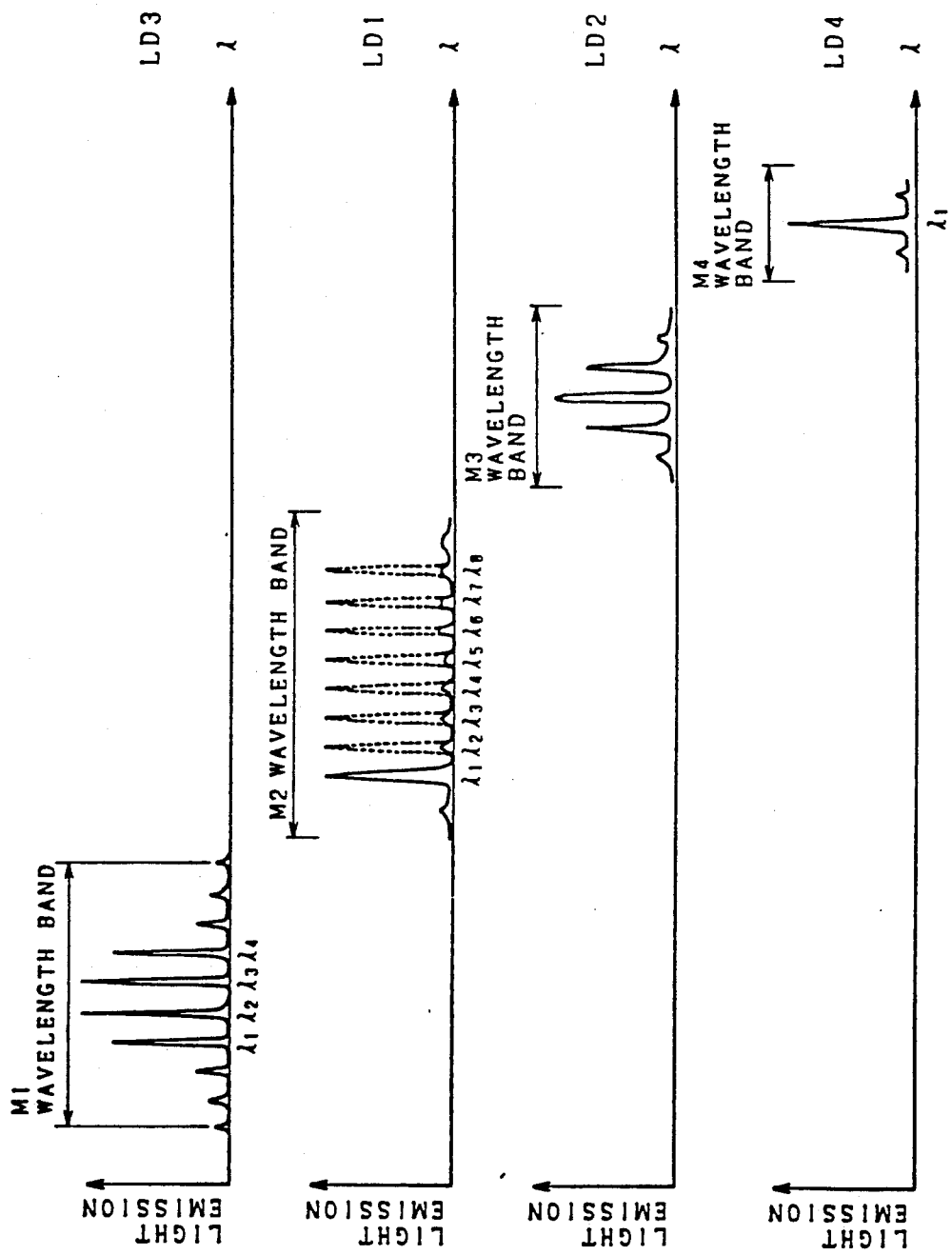
FIG. 4 is a graph showing wavelength spectra of a semiconductor laser.

Next, to make focusing and tracking, the LD3 and the LD4 are lit by the LD power controlling circuit 23 and the LD power controlling circuit 24. The oscillation wavelengths of the LD3 and the LD4 belong to different wavelength bands in correspondence to the structure of the recording medium of the disc 5 described later. FIG. 4 is a graph showing emission spectra of the semiconductor lasers LD1, LD2, LD3 and LD4. In FIG. 4, the oscillation wavelength of the LD3 belongs to the M1 wavelength band, the oscillation wavelength of the LD1 to the M2 wavelength band, the oscillation wavelength band of the LD2 to the M3 wavelength band, and the oscillation wavelength of the LD4 to the M4 wavelength band, respectively.

The semiconductor laser can generate laser oscillation at discontinuous longitudinal mode wavelengths having nearly constant intervals in the emission spectra thereof. Also, the oscillation wavelength varies depending on temperature, injection current and the like, and if the wavelength capable of oscillation are discontinuous as described above, the variation thereof becomes a discontinuous, so-called longitudinal mode jump.

In the present invention, utilizing this longitudinal mode jump, each discontinuous laser oscillation wavelength generated by increasing the injection current is used for record of one-bit data.

FIG. 4 shows the state of oscillations of the M2, M3, M1 and M3 wavelength bands whereto the LD1, LD2, LD3 and LD4 belong, and among them, the oscillation wavelengths of the LD1 utilized for record and regeneration of information are taken as $\lambda 1, \lambda 2, \lambda 3 \ldots$ in the sequence from shorter wavelengths.

The light projected from the LD3 is converted into parallel light rays by the collimator lens 103, and plunges into the dichroic mirror 113. The dichroic mirror 113 is given a characteristic of reflecting only the light of the M1 wavelength band, and therefore reflects the light of the LD3 belonging to the M1 wavelength band, and bends the optical path thereof at a right angle toward the dichroic mirror 112. The dichroic mirror 112 transmits the light of the M1 wavelength band, and since the dichroic mirror 111 is given a characteristic of reflecting it, the light projected from the LD3 is reflected on the dichroic mirror 113, transmitted through the dichroic mirror 112, reflected on the dichroic mirror 111, and plunges into the PBS 105 as parallel light rays. Also, the light projected from the LD4 is converted into parallel light rays by a collimator lens 104, and thereafter plunges into the mirror 114, and the optical path thereof is bent at a right angle toward the dichroic mirror 113. The dichroic mirror 113 and the dichroic mirror 112 transmit the light of the M4 wavelength band, and since the dichroic mirror 111 is given a characteristic of reflecting it, the light projected from the LD4 is reflected on the mirror 114, transmitted through the dichroic mirror 113 and the dichroic mirror 112, reflected on the dichroic mirror 111, and plunges into the PBS 105 as parallel light rays.

The light from the LD3 and LD4 plunging into the PBS 105 is linearly polarized light having only the P polarized light component to the incident surface of PBS 105, and therefore it is transmitted through the PBS 105 and plunges into the quarter-wave plate 106. The quarter-wave plate 106 is set so that the amount of phase shift thereof from the oscillation wavelength of the LD1 is one-fourth of the wavelength, and therefore the light from the LD3 and the LD4 passing through the quarter-wave plate 106 does not become circularly polarized light, but becomes elliptically polarized light, plunges into the OBL 107, and is condensed onto the disc 5 by the OBL 107.

The light reflected from the disc 5 is condensed again by the OBL 107 to become parallel light rays, and returns to the quarter-wave plate 106, and the returned light is phase-shifted again so that the amount of shift of the phase from the oscillation wavelength of the LD1 becomes one-fourth of the wavelength, and therefore the light is converted from the elliptically polarized light near circularly polarized light into elliptically polarized light near lineally polarized light having only the S polarized light component to the incident surface of the PBS 105. Accordingly, almost all of the light returned from the disc 5 is reflected by the PBS 105, and the optical path thereof is bent at a right angle toward the hologram lens 108, and the hologram lens 108 condenses the light onto a photo detector disposed at a different position of the PD array 109 in response to the wavelength, and each photo detector outputs a current proportional to the intensity of the received light, and the head amplifier 25 converts an output current of each photo detector of the PD array 109 into a voltage respectively, supplying it to the LD wavelength controlling circuit 7, the servo circuit 6 and the error correcting circuit 26.

Figure 5:
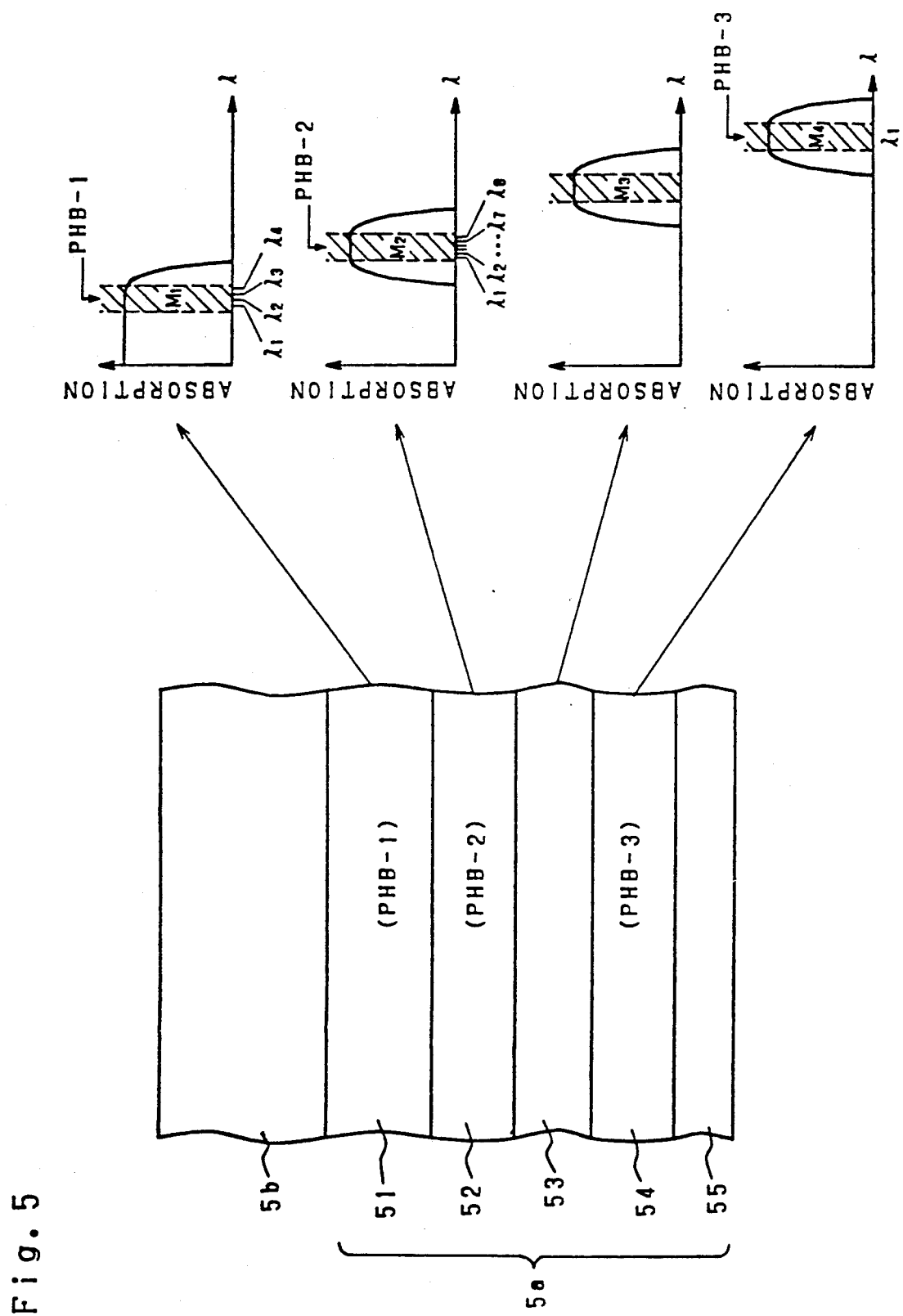
FIG. 5 is a cross-sectional view showing absorption spectra in correspondence to a structure of a recording medium.

FIG. 5 is a view showing a schematic cross-sectional structure of the disc 5 and absorption spectra of the wavelength bands M1, M2, M3 and M4, and the disc 5 is constituted with a protective layer 5b protecting a recording medium 5a to be described later form exterior, and the recording medium 5a wherein a first auxiliary layer 51 for focusing and tracking, a recording-/regenerating layer 52 recording data, a heat generating layer 53 for erasing which raises the temperature of the recording/regenerating layer 52 by heating it by means of laser irradiation and erases data of the recording-/regenerating layer 52, a second auxiliary layer 54 for focusing and a reflecting film layer 55 reflecting the light plunging from the protective layer 5b side are laminated in sequence. Also, the first auxiliary layer 51, the recording/regenerating layer 52, the heat generating layer 53 for erasing and the second auxiliary layer 54 have light absorption spectra shown in FIG. 3, and furthermore, for the first auxiliary layer 51, the recording/regenerating layer 52 and the second auxiliary layer 54, materials causing the PHB phenomena respectively in the M1 wavelength band, the M2 wavelength band and the M4 wavelength band are used.

The configuration is such that information is recorded on the disc 5 in a spiral shape or concentric circular shape, and this recording locus is called a track, and the data record position installed on the track or along the track is called a pit. The optical head 10 records and regenerates information while tracking this track, and makes a high-speed access to a required track across the track.

Figure 6:
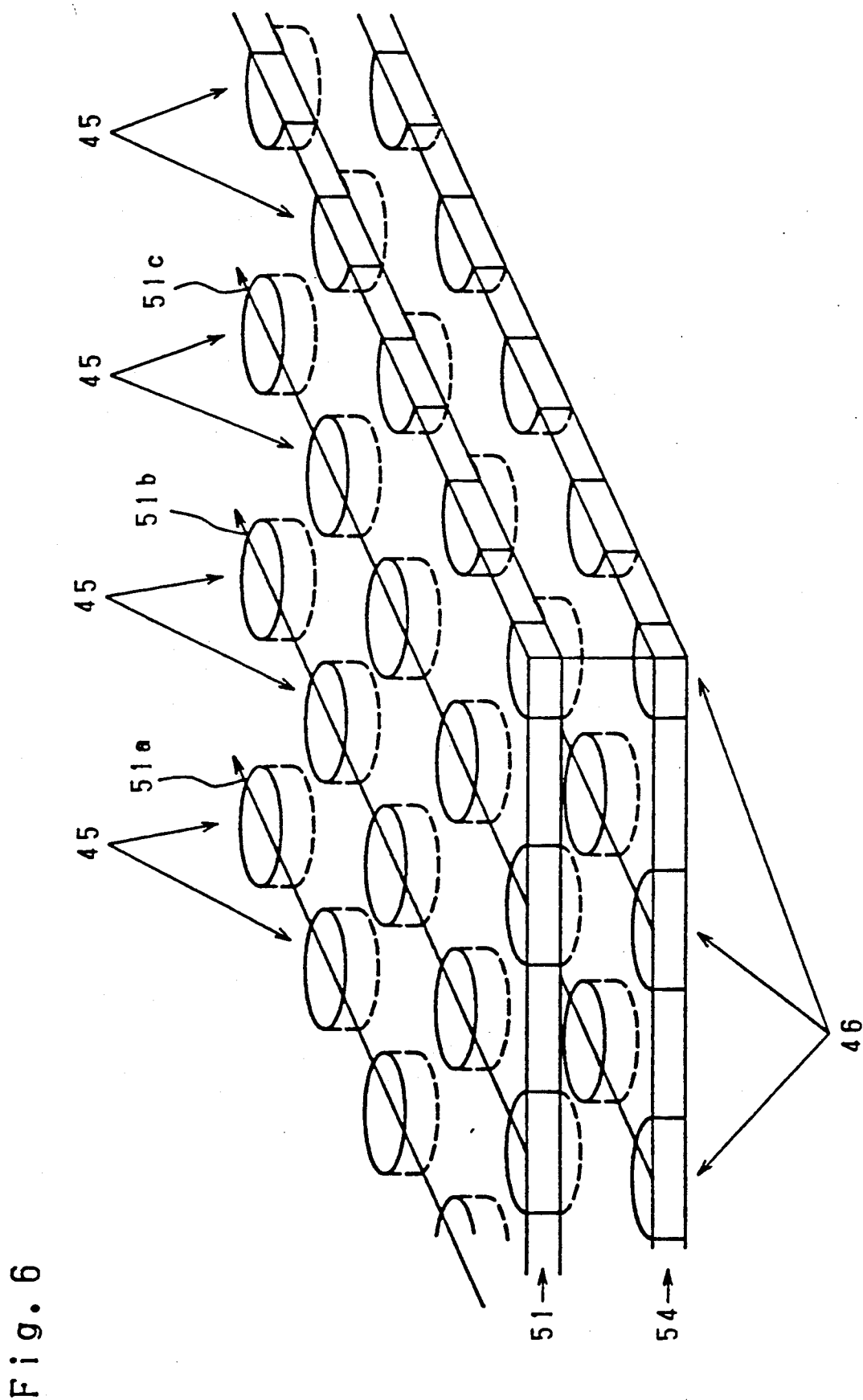
FIGS. 6 and 7 are fragmental perspective views of the recording medium.
Figure 7:
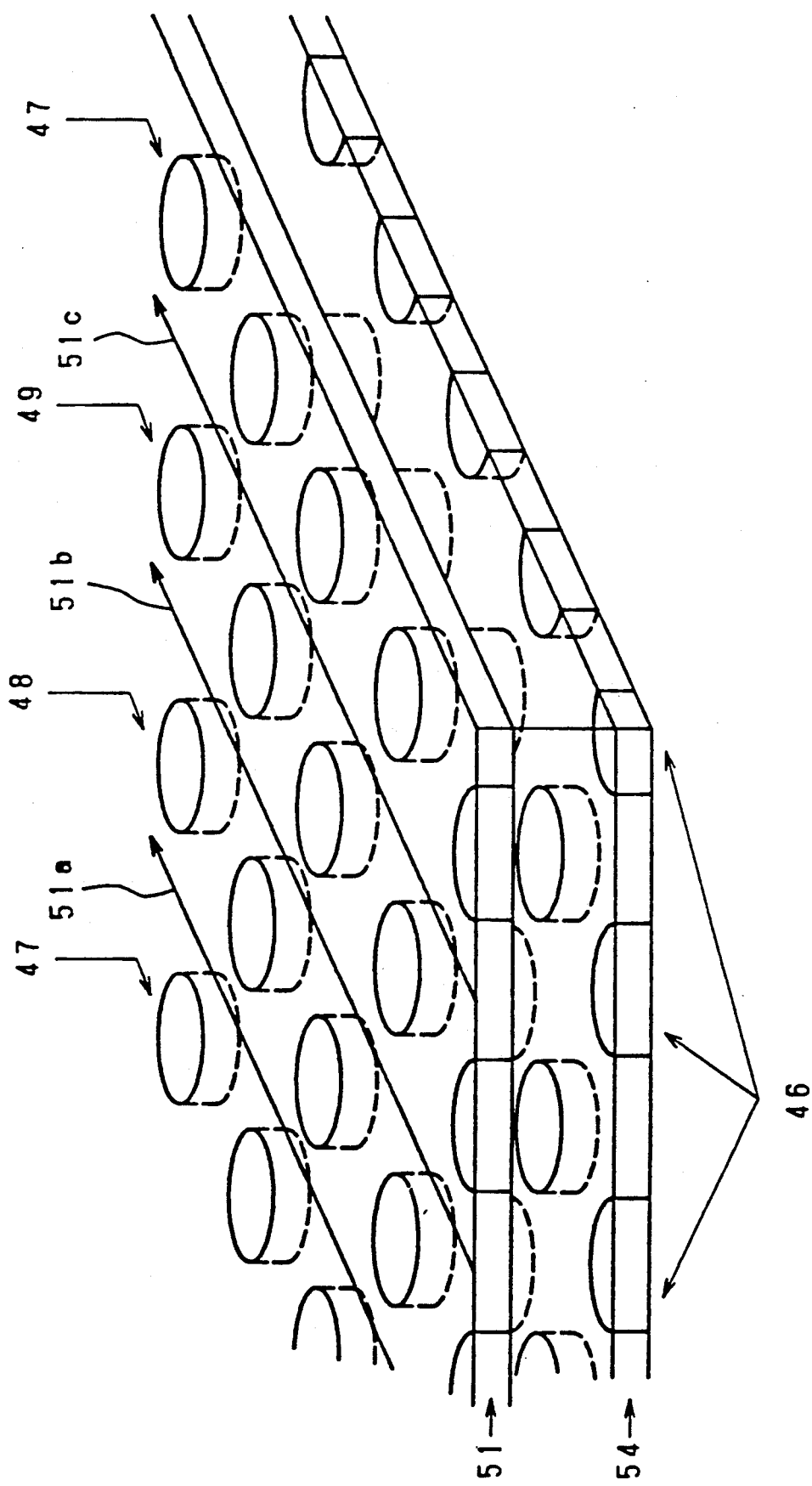

FIG. 6 and FIG. 7 are schematic views of pits formed on the first auxiliary layer 51 and the second auxiliary layer 54 to be used for tracking and focusing. On the first auxiliary layer 51 and the second auxiliary layer 54, pits 45, 45, 45 ... where the holes by the wavelength $\lambda 1$ belonging to the M1 wavelength band (hereinafter abbreviated as $\lambda 1$ (M1)) are formed, pits 46, 46, 46 ... where the holes by the wavelength $\lambda 1$ belonging to the M4 wavelength band (hereinafter abbreviated as $\lambda 1$ (M4)) are formed, pits 47, 47, 47 ... where holes by the wavelength $\lambda 2$ belonging to the M1 wavelength band (hereinafter abbreviated as $\lambda 2$ (M1)) are formed, pits 48, 48, 48 ... where the holes by the wavelength $\lambda 3$ belonging to the M1 wavelength band (hereinafter abbreviated as $\lambda 3$ (M1)) are formed, and pits 49, 49, 49 ... where the holes by the wavelength $\lambda 4$ belonging to the M1 wavelength band (hereinafter abbreviated as $\lambda 4$ (M1)) are formed are installed at predetermined intervals.

This means that the pits 45, 45, 45 ... of the first auxiliary layer 51 are installed at the positions which are on tracks 51a, 51b, 51c ... corresponding to 52a, 52b, 52c ... (not illustrated) on the recording/regenerating layer 52 and correspond to data recording pits of the recording/regenerating layer 52, and similarly the pits 46, 46, 46 ... of the second auxiliary layer 54 are installed at the positions which are on the locus corresponding to the track on the recording/regenerating layer 52 and correspond to the data recording pits of the recording/regenerating layer 52, and the pits of the recording/regenerating layer 52 are located between the pits 45 of the first auxiliary layer 51 and the pits 46 of the second auxiliary layer 54. Also, the pits 47, 48 and 49 of the first auxiliary layer 51 are installed respectively at the intermediate positions in the midst of the tracks 51a, 51b, 51c ... corresponding to the tracks 52a, 52b, 52c ... of the recording/regenerating layer 52 along the tracks 51a, 51b, 51c ..., and the intermediate positions between the pits 47 and 48, between the pits 48 and 49 and between the pits 49 and 47 are the tracks 51a, 51b and 51c respectively.

Accordingly, by irradiating the lasers of the M1 wavelength band and the M4 wavelength band, an output current responding to presence or absence of the hole is given to the head amplifier 25 from each photo detector of the PD array 109 corresponding to $\lambda 1$ (M1), $\lambda 1$ (M4), $\lambda 2$ (M1), $\lambda 3$ (M1) and $\lambda 4$ (M1) of the PD array 109, and the head amplifier 25 converts it into a voltage, giving it to the servo circuit 6. The servo circuit 6 detects the amount of change in this output current, and for example, in the case of regenerating information from the track 52b of the recording/regenerating layer 52 corresponding to the track 51b, the actuators for focusing 115a and 115b are driven so that the amounts of change in the output currents at $\lambda 1$(M1) and $\lambda 1$(M4) become equal, and the OBL 107 is moved in the direction of the optical axis to focus the light on the recording/regenerating layer 52, while the actuators for tracking 116a and 116b are driven so that the amounts of change in the output currents at $\lambda 3$(M1) and $\lambda 4$(M1) become equal, and the OBL 107 is moved perpendicularly to the plane made by the optical axis and the track, and thereby the light spot condensed by the OBL 107 is controlled to track the track 52b in the recording-/regenerating layer 52 all the time.

Figure 8:
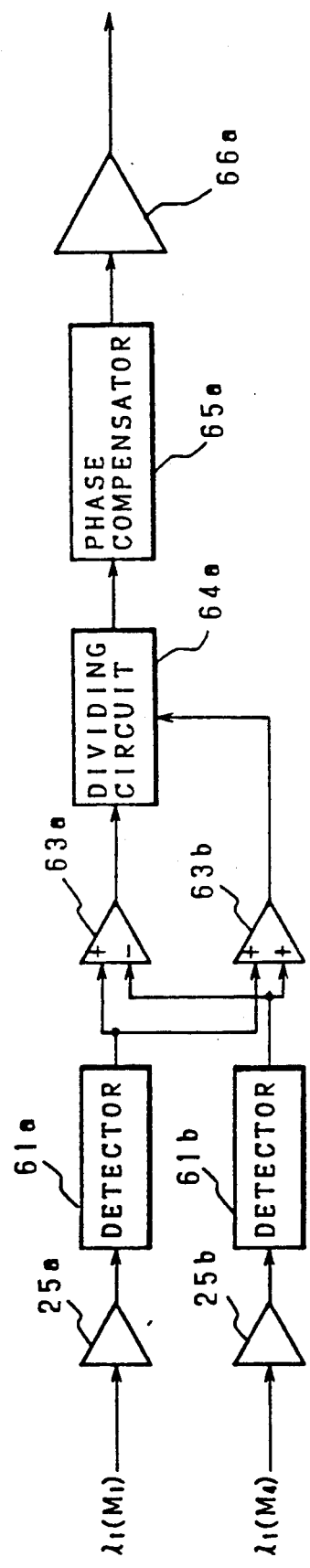
FIGS. 8 and 9 are circuit diagrams of servo circuits, FIGS. 10(a)-(e), 11(a) and (b) and 12(a)-(e) are waveform diagrams explaining servo operation, FIGS. 13(a) and (b) and 14(a) and (b) are waveforms explaining recording and regenerating operations.
Figure 9:
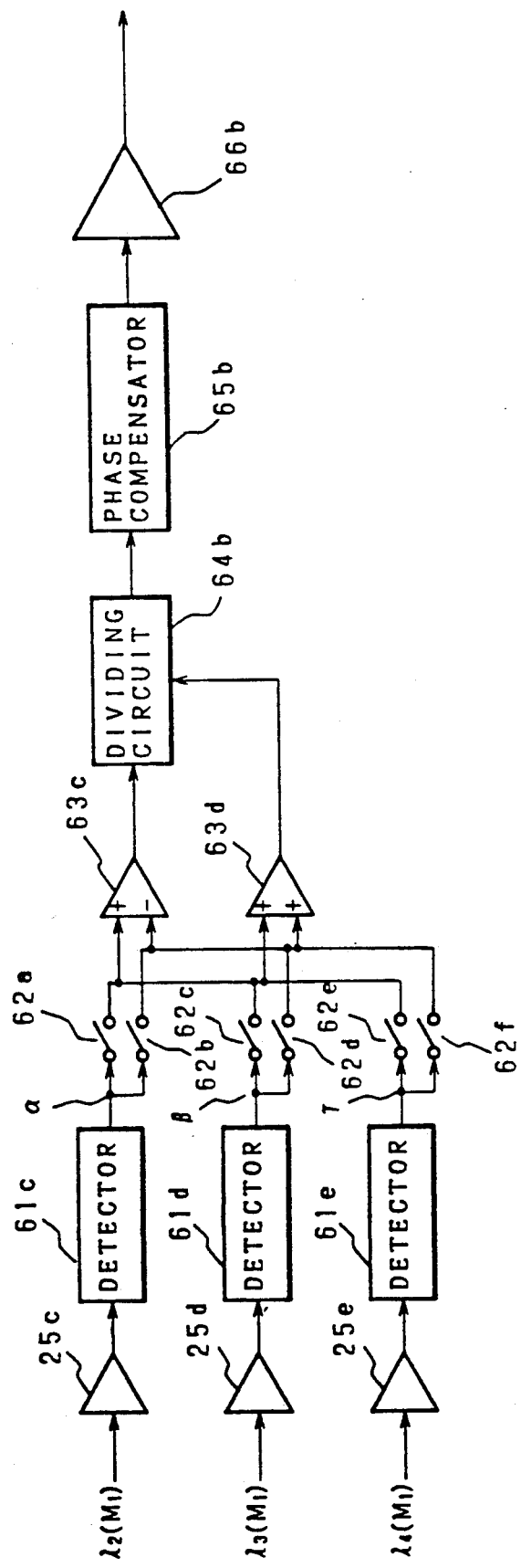

FIG. 8 and FIG. 9 are block diagrams showing configurations of the servo circuits 6, and FIG. 8 shows a focusing servo circuit, and FIG. 9 shows a tracking servo circuit. Referring to FIG. 8, head amplifiers 25a and 25b convert the output currents of $\lambda 1$(M1) and $\lambda 1$(M4) into voltages respectively, and these signals are outputted respectively to detectors 61a and 61b consisting of a band-pass filter and an amplitude detector. The detectors 61a and 61b pick up frequency components (hereinafter referred to as servo frequency) determined by rotational number of the disc 5 and intervals of the pits 45, 46, 47, 48 and 49 from the above-mentioned voltage signals, detecting the amplitude as a regeneration envelope. Output signals from the detectors 61a and 61b are outputted to operational amplifiers 63a and 63b and are operation-amplified, and one operational amplifier 63a performs subtraction and the other operational amplifier 63b performs addition. Signals from these operational amplifiers 63a and 63b are outputted to a dividing circuit 64a, and the dividing circuit 64a divides the output of the operational amplifier 63a by the output of the operational amplifier 63b. The result of the division is outputted to a phase compensator 65a, and the phase compensator 65a outputs the result of the division to a driver amplifier 66a while stabilizing a feedback controlling loop, and on the basis of this signal, the driver amplifier 66a drives the actuators for focusing 115a and 115b.

Also, as shown in FIG. 9, head amplifiers 25c, 25d and 25e convert the output currents of $\lambda 2$(M1), $\lambda 3$(M1) and $\lambda 4$(M1) respectively into voltages, and these signals are outputted respectively to detectors 61c, 61d and 61e consisting of a band-pass filter and an amplitude detector. Output signals $\alpha$, $\beta$ and $\gamma$ from the detectors 61c, 61d and 61e are outputted to switches 62a, 62b, 62c, 62d, 62e and 62f, and are outputted selectively to operational amplifiers 63c and 63d in response to the right or left positions of two pits across the track which is tracked by on and off of those signals. The operational amplifiers 63c and 63d operation-amplify these signals, and the operational amplifier 63c operation-amplifies a difference between the right-side output and the left-side output which are separated as described above, and the operational amplifier 63d operation-amplifies a sum of the both outputs, and those signals are outputted to a dividing circuit 64b, and the dividing circuit 64b divides an output of the operational amplifier 63c, that is, a difference by an output of the operational amplifier 63d, that is, a sum. The result of the division is outputted to a phase compensator 65b, and the phase compensator 65b outputs the result of the division to a driver amplifier 66b while stabilizing a feedback controlling loop, and on the basis of this signal the driver amplifier 66b drives the actuators for tracking 116a and 116b.

FIG. 10 shows regeneration envelopes of the λ1(M1) pits 45 and the λ1(M4) pits 47 and the results of operations of the difference and sum thereof versus positions (X) in the direction of the optical axis in correspondence to positions of the condensed light spot on the recording medium 5a. In addition, the abscissas of FIGS. 10 (a)–(d) represent the position (X) of the OBL 107 and this value increases as the position comes nearer to the disc 5. FIG. 10 (a) shows a regeneration envelope of the λ1(M1) pits 45, which is an output signal of the detector 61a shown in FIG. 8. A full line in FIG. 10 (b) shows a regeneration envelope of the λ1(M4) pits 46, which is an output signal of the detector 61b shown in FIG. 8. Broken lines show regeneration envelopes in the case where the reflecting film layer 55 does not exist and the light is transmitted. FIG. 10 (c) shows the result of subtraction of the regeneration envelopes shown in FIG. 10 (a) and FIG. 10 (b), which is an output signal of the operational amplifier 63a shown in FIG. 8. FIG. 10 (d) shows the result of addition of the regeneration envelopes shown in FIG. 10 (a) and FIG. 10 (b), which is an output signal of the operational amplifier 63b. FIG. 10 (e) shows the position of condensation of the light spot corresponding to the position X of the OBL 107 shown in FIG. 10 (a), FIG. 10 (b), FIG. 10 (c) and FIG. 10 (d) in each layer of the recording medium 5a. Since the light is reflected on the reflecting film layer 55, the position of the light spot condensed after reflection continues displacing in the direction of getting near to the surface of the disc 5 even after the focal point of the OBL 107 has reached the reflecting film layer 55, that is, if the position X increases monotonously, it is presumed to pass through the first auxiliary layer 51 again from the second auxiliary layer 54 as shown by dotted lines.

Figure 10A:
Figure 10B:
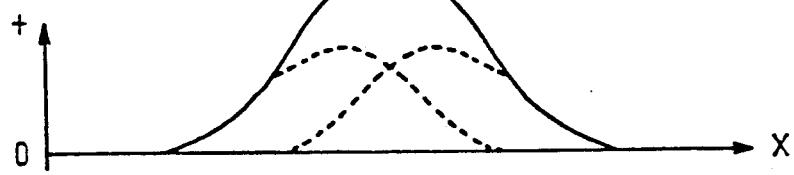
Figure 10C:
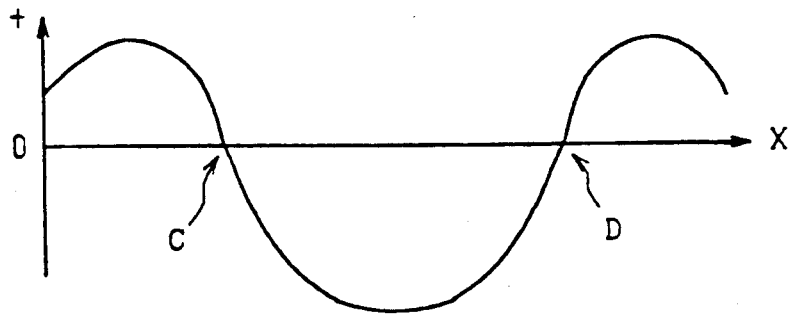
Figure 10D:
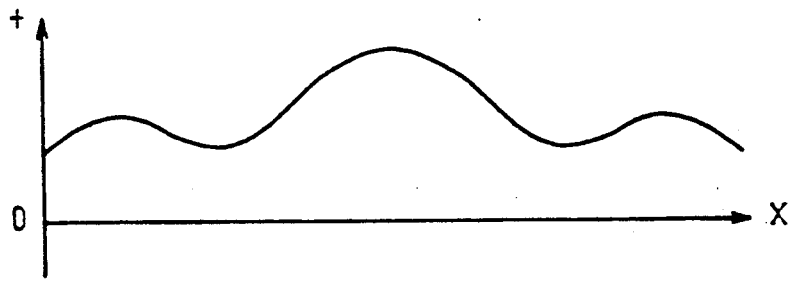
Figure 10E:
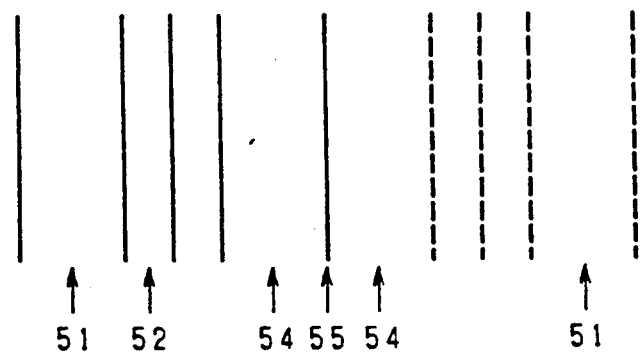
Figure 11:
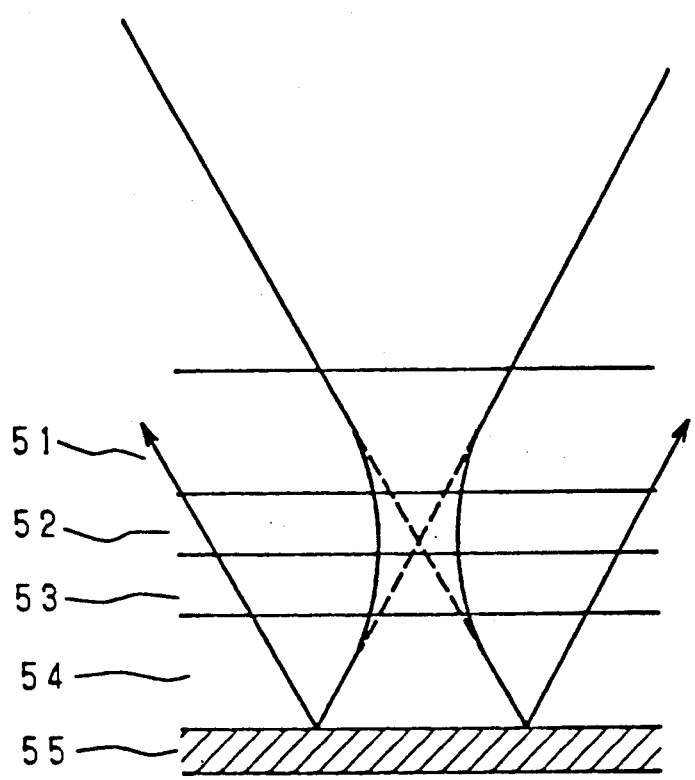
Figure 11:
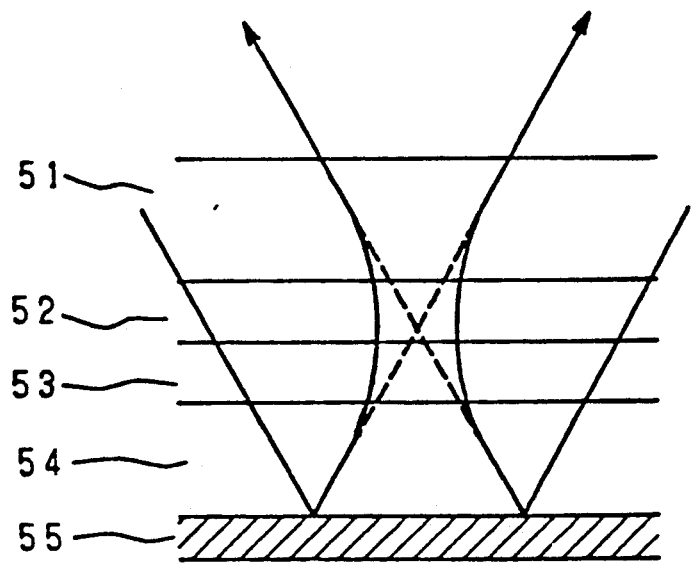
Figure 12A:
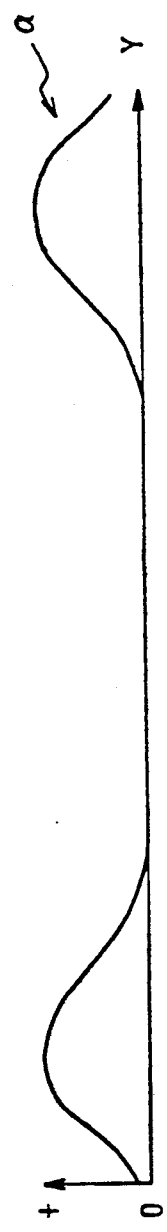
Figure 12B:
Figure 12C:
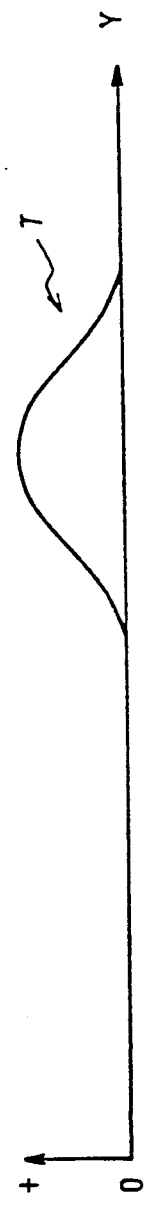
Figure 12D:
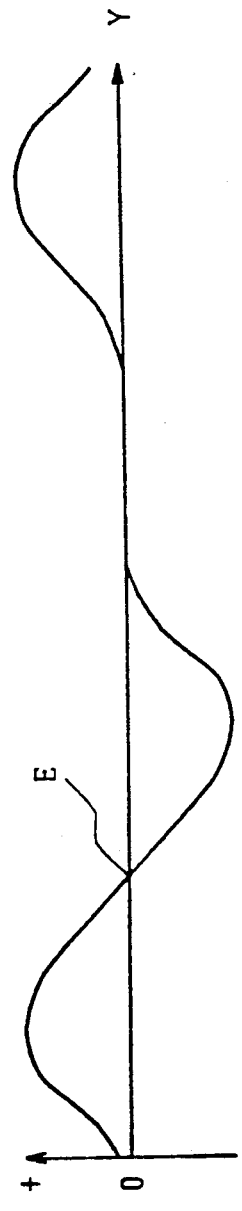
Figure 12E:
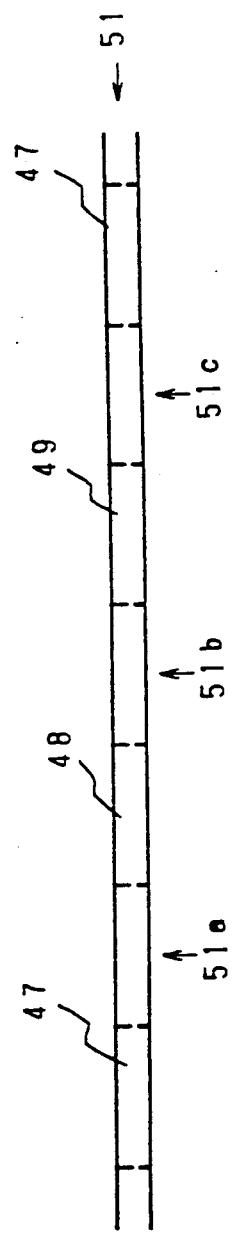

FIG. 11 (a) shows the condensed state of the light in the case where the position X is a position C shown in FIG. 10 (c), that is, the condensed light spot is in the record regeneration layer 52, and FIG. 11 (b) shows the condensed state of the light in the case where the position X is a position D shown in FIG. 10 (c). Accordingly, when the difference signal shown in FIG. 10 (c) being an output signal of the operational amplifier 63a is positive, the polarity driving the actuators for focusing 115a and 115b is adjusted to the direction of bringing the OBL 107 close to the disc 5, that is, the direction of increasing the position X, and when the position X passes through the position C and the above-mentioned difference signal becomes negative, the polarity is adjusted to the direction of decreasing the value X, and the OBL 107 is driven by the actuators for focusing 115a and 115b, and thereby the condensed state of the light shown in FIG. 11 (a) is obtained all the time. However, the region wherein the value fed back to the servo loop of focusing is linear and stable is limited to a range in the vicinity of the position C, and therefore some draw-in means of closing the servo loop within this range is required to be provided, and for example, the use of the well-known draw-in system of focusing servo of the CD player suffices this requirement. Also, in the case where the value X gets near to the disc 5 beyond the position D, if the above-mentioned difference signal is positive, the OBL 107 is further driven in the direction of getting near to the disc 5, and therefore a means of detecting it and preventing the OBL 107 from collision with the disc 5 is required to be provided, and for example, the use of the well-known lens collision preventing system of the CD player suffices this requirement likewise the above-mentioned draw-in means.

FIG. 12 shows regeneration envelopes of the λ2(M1) pits 47, the λ3(M1) pits 48 and the λ4(M1) pits 49 installed in the midst of each track and the result of subtraction thereof versus the position Y of the OBL 107 in the direction which is perpendicular to the optical axis and crosses the tracks in correspondence to the position of the condensed light spot in the recording medium 5a. In addition, the abscissas of FIGS. 12 (a)–(d) show the position Y of the OBL 107, and the value thereof increases as the position X moves toward the track 51c shown in FIG. 7. FIG. 12 (a) shows a regeneration envelope of the λ2(M1) pits 47, which is an output signal of the detector 61c shown in FIG. 9. FIG. 12 (b) shows a regeneration envelope of the λ3(M1) pits 48, which is an output signal of the detector 61d shown in FIG. 9. FIG. 12 (c) shows a regeneration envelope of the λ4(M1) pits 49, which is an output signal of the detector 61e shown in FIG. 9. FIG. 12 (d) shows the result of subtraction of the regeneration envelopes of the pits 47 and 48 shown in FIG. 12(a) and FIG. 12(b), which is an output signal of the operational amplifier 63c shown in FIG. 9. In FIG. 10(d), symbol E designates a position where the result of subtraction of the both regeneration envelopes is zero, that is, the output currents become equal. In addition, illustration of the output signal of the operational amplifier 63d adding the both regeneration envelopes is omitted. FIG. 12(e) shows the positions of the condensed light spot in the first auxiliary layer 51 of the recording medium 5a in correspondence to the position Y of the OBL 107 shown in FIGS. 12(a), (b), (c) and (d). Accordingly, for example, in the case of tracking the track 51a, when the difference signal shown in FIG. 12(d) which is an output signal of the operational amplifier 63c is positive, the polarity driving the actuators for tracking 116a and 116b is adjusted to move the OBL 107 in the direction of increasing the value (Y), that is, toward the λ3(M1) pits 48, and when the value (Y) exceeds the position E and the outputted difference signal is negative, the actuators for tracking 116a and 116b drive the OBL 107 in the direction of decreasing the value (Y), and thereby the condensed light spot tracks the track 51a all the time. However, like the case of the focusing servo, the region wherein the value fed back to the servo loop is linear and stable is limited in the vicinity of the position E, and therefore some draw-in means of closing the servo loop within this range is required to be provided, and for example, the use of the well-known draw-in system for tracking servo of the CD player suffices this requirement.

Next, description is made on procedures of recording and regenerating information on an aimed track of the recording/regenerating layer 52 in the state of focusing and tracking that track by the condensed light spots of the LD3 and the LD4.

The LD1 shown in FIG. 3 is lit with an intensity that the LD power controlling circuit 21 does not break the holes already formed in the recording/regenerating layer 51. For the oscillation wavelength of the LD1, by varying the injection current into the wavelength controlling system of the LD1, for example, in a step fashion by the LD wavelength controlling circuit 7, the LD1 is controlled to oscillate at intermittent wavelengths from λ1(M2) to λ8(M2) belonging to the M2 wavelength band wherein the PHB phenomenon occurs in the recording/regenerating layer 52 by a longitudinal-mode jump of the oscillation wavelength. These wavelengths from λ1 to λ8 are used respectively for 8-bit data recording, and these eight bits are multiple-recorded as one-unit information. The light projected from the LD1 is converted into parallel light rays by the collimator lens 101, plunging into the dichroic mirror 111. Since the dichroic mirror 111 is given a characteristic of transmitting the light of the M2 wavelength band, it transmits the light of the LD1 belonging to the M2 wavelength band, and the light plunges into the PBS 105 as linearly polarized light having only the P polarized light component to the incident surface of the PBS 105. Accordingly, the light from the LD1 is transmitted through the PBS 105, becomes nearly perfectly circularly polarized light at the quarter-wave plate 106, plunges into the OBL 107, and is condensed onto the disc 5. For the OBL 107, a lens is used whereto aberration compensation capable of neglecting the chromatic aberration in the wavelength bands from the M1 wavelength band to the M4 wavelength band is applied, and the position of condensation of the light from the LD1 is made to agree with the position of condensation of the light of the lights from the LD3 and the LD4. Accordingly, the condensed light spot of the LD1 which forms the holes in the recording/regenerating layer 52 to record information and reads presence or absence of the holes to regenerate information also tracks a required track on the recording/regenerating layer 52.

For example, in the case of recording one-byte information, "10010110", when the injection current into the LD1 is varied stepwise in response to an output of clock Tm (m is the number of order of clock output, taking the recording time of a first bit as clock $T_1$, the LD power controlling circuit 21 raises the light emitting power of the LD1 to a level required to form the holes at the recording/regenerating layer 52 at $T_1$, $T_4$, $T_6$ and $T_7$. Resultingly, in the recording/regenerating layer 52, the holes are formed at the pits of λ1(M2), λ4(M2), λ6(M2) and λ7(M2).

The light reflected from the disc 5 is condensed by the OBL 107, becomes parallel light rays, and returns to the quarter-wave plate 106. The returned light is phase-shifted by the quarter-wave plate 106 so that the amount of phase shift becomes one-fourth of the wavelength again from the oscillation wavelength of the LD1, and therefore the light is converted from circularly polarized light into linearly polarized light having only the S polarized light component to the incident surface of the PBS 105. Accordingly, the light having returned from the disc 5 is reflected by the PBS 105, and the optical path thereof is bent at a right angle toward the hologram lens 108, and the hologram lens 108 condenses the incident light onto the photo detectors disposed at the corresponding position of the PD array 109 in response to the wavelength.

FIG. 13 shows a positional relationship between the pits and the condensed light spot on the recording/regenerating layer 52 and the change in the oscillation wavelength of the LD1 as the change with time in the injection current into the wavelength controlling system. In FIG. 13(a), the ordinate represents the oscillation wavelength λn belonging to the M2 wavelength band used in correspondence to data wherein one unit consists of eight bits, and the abscissa represents clock Tm generated by a pulse-shaped current. In addition, m=X shows a period of record pause. The injection current into the wavelength controlling system of the LD1 changes stepwise and periodically in response to an output of clock Tm. In this embodiment, the oscillation wavelength λn of the LD1 is so controlled that it oscillates at the wavelength λn of n=m corresponding to the clock Tm. Also, as shown in FIG. 13(b), full lines and broken lines show relative positions of the condensed light spot of the LD1 to the rotating disc 5. Accordingly, by generating the clock Tm using the PLL circuit so that the period from the clock To to the next clock To becomes equal to the period of the servo frequency, as shown in FIG. 13(b), the condensed light spot of λ1(M2) agrees with the position of λ1(M2) pit and the condensed light spot of λ8(M2) agrees with the position of λ8(M2) pit. Also, by parting the pit distance of λ1(M2) of each record unit by a distance that no interference occurs as viewed from the spatial frequency characteristics of the condensed light spot, the output current of the photo detector of the PD array 109 receiving only the λ1(M2) component is not affected by waveform interference, and detection of presence or absence of the hole by the wavelength of λ1(M2) can be made by checking the magnitude of the output current at timing of clock $T_1$. The above-mentioned matter holds true likewise of the pits from λ2(M2) to λ8(M2).

Figure 14:
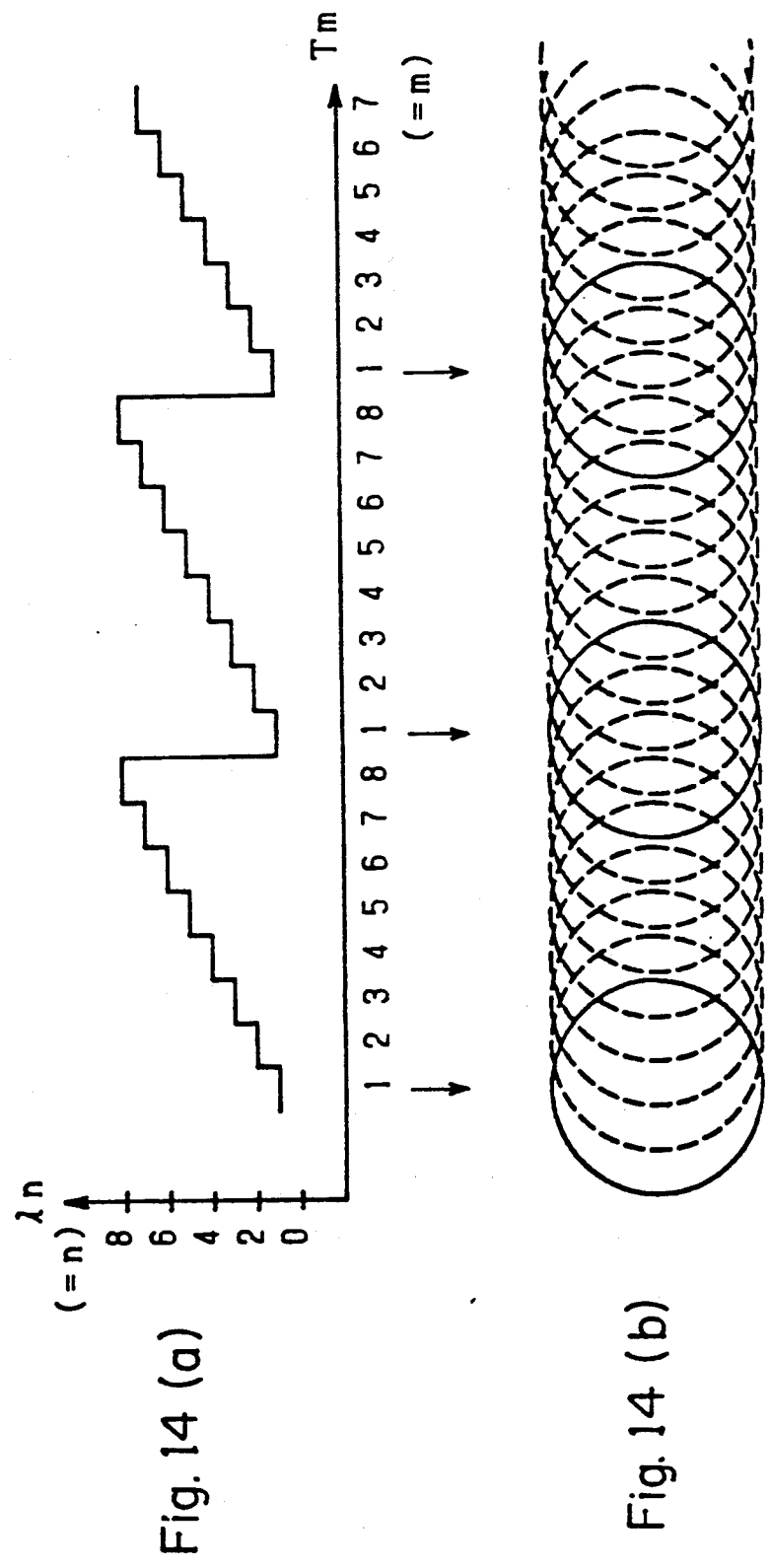

In addition, FIG. 14 is a waveform graph showing another embodiment in accordance with the present invention, and in this embodiment, two clocks of the period of record pause λX are provided every time the irradiation wavelength is scanned from λ1 to λ8, and thereby separation is made by a distance that no interference occurs between recorded informations using the same wavelength in the multiple-recorded information on a unit basis, and if this separating distance can be maintained, a configuration of continuous record and regeneration may be adopted without providing the period of record pause.

The head amplifier 25 converts an output current from the photo detector corresponding to each wavelength into a voltage, and converts it into a voltage of "L" or "H" in response to the converted voltage value, and thereafter latches the data converted into "L" or "H" at timing of clock Tm corresponding to each wavelength, and detects presence or absence of the hole. Furthermore, the error correcting circuit 26 makes error correction with 8-bit (1-byte) information taken as one unit at the point when complete information on presence or absence of the holes in pits from λ1(M2) to λ8(M2) is obtained. The error correcting circuit 26 makes error correction at a high speed and with a high efficiency utilizing that the error correction code is configurated with a plurality of symbols (one symbol is one byte) in the information recording format, and corrects regenerated information into accurate information.

Figure 15:
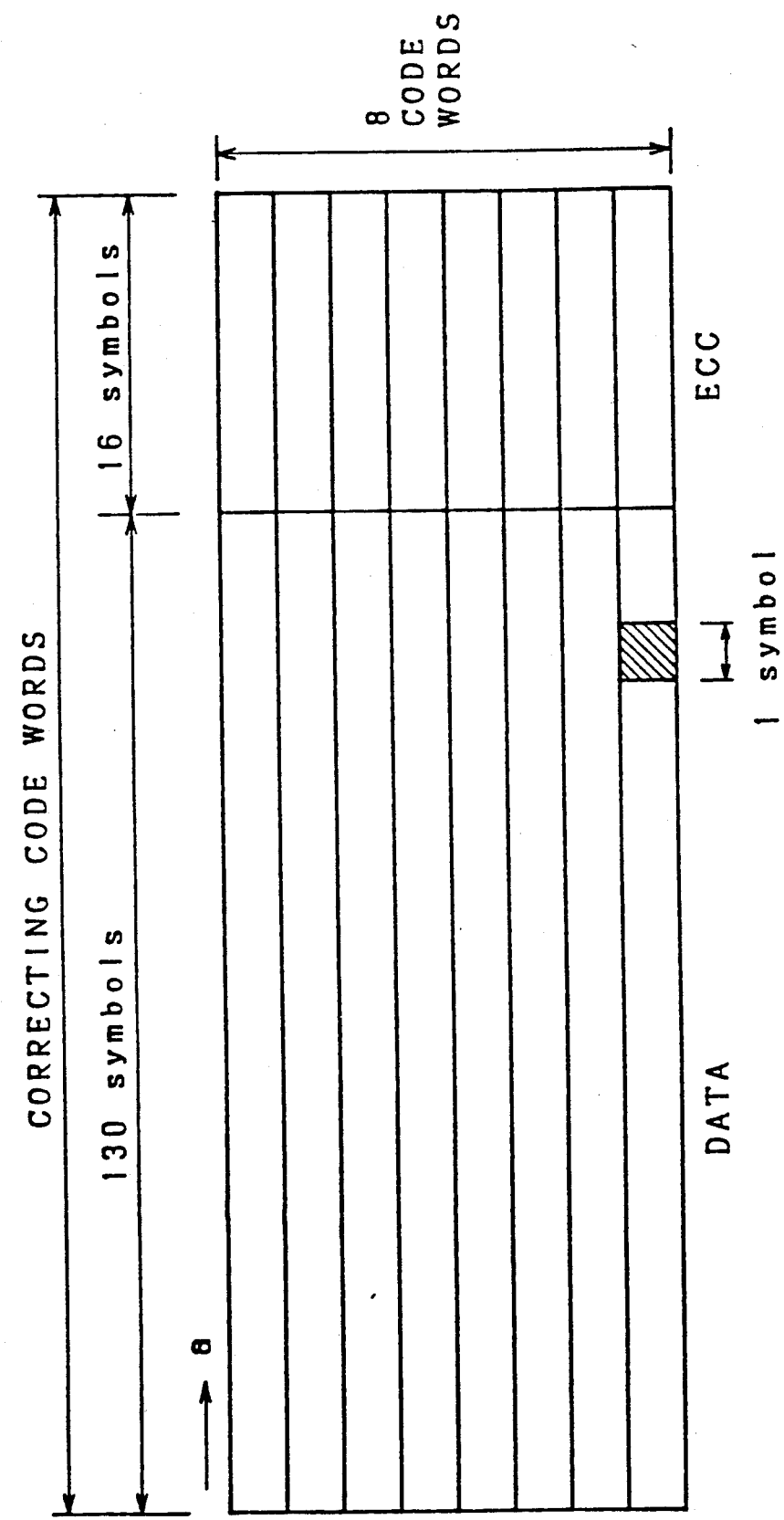
FIG. 15 is a conceptual view showing a recording format of information for confirming the wavelength.

Hereinafter, description is made on procedures of an error correcting method using a specific example. In this embodiment, unit of data processing such as transfer and record, one byte, is taken as one symbol, and 16 symbols of error correcting codes (ECC) such as lead solomon code and adjoining code which are produced on the basis of a predetermined rule are given to 130 symbols of data. In addition, correction can be made up to eight symbols of errors by these 16 symbols of ECCs. Accordingly, a group of data wherein ECCs are given to information to be recorded form a series of correcting code words having regularity, and in this embodiment, error correction is made every time eight units of error correcting code words are recorded. FIG. 15 represents the above-mentioned procedures based on a conceptual view of a group of data, for example, as shown in the Nikkei Electronics (pp. 204–205, Nov. 21, 1983). Whether or not recorded data is wrong is judged on a symbol basis, and even if a single bit is wrong out of one-symbol data composed of eight bits, that symbol is to be corrected as a wrong symbol. Then, in the multiple-wavelength record, when a record error takes place due to a defective medium or the like, a record error is produced in 8-bit data recorded by a different wavelength on physically nearly the same bit. However, in the case where recorded data given ECCs is recorded in direction a by the same wavelength like the data record by the (frequency selective optical data record/regenerate) conventional multiple-wavelength recording-/regenerating apparatus, when a record error takes place due to a defective medium or the like, if a record error is produced in 8-bit data multiple-recorded on the same bits by different wavelengths, eight symbols containing these wrong bits become wrong data. On the other hand, by multiple-recording data in the direction of a in FIG. 15 in the direction of a different wavelength, even if 8-bit data recorded on physically nearly the same bits becomes wrong due to a defective medium or the like, resulting in only a record error of one symbol composed of these 8-bit data, resulting in an improvement in the correcting ability.

Figure 16:
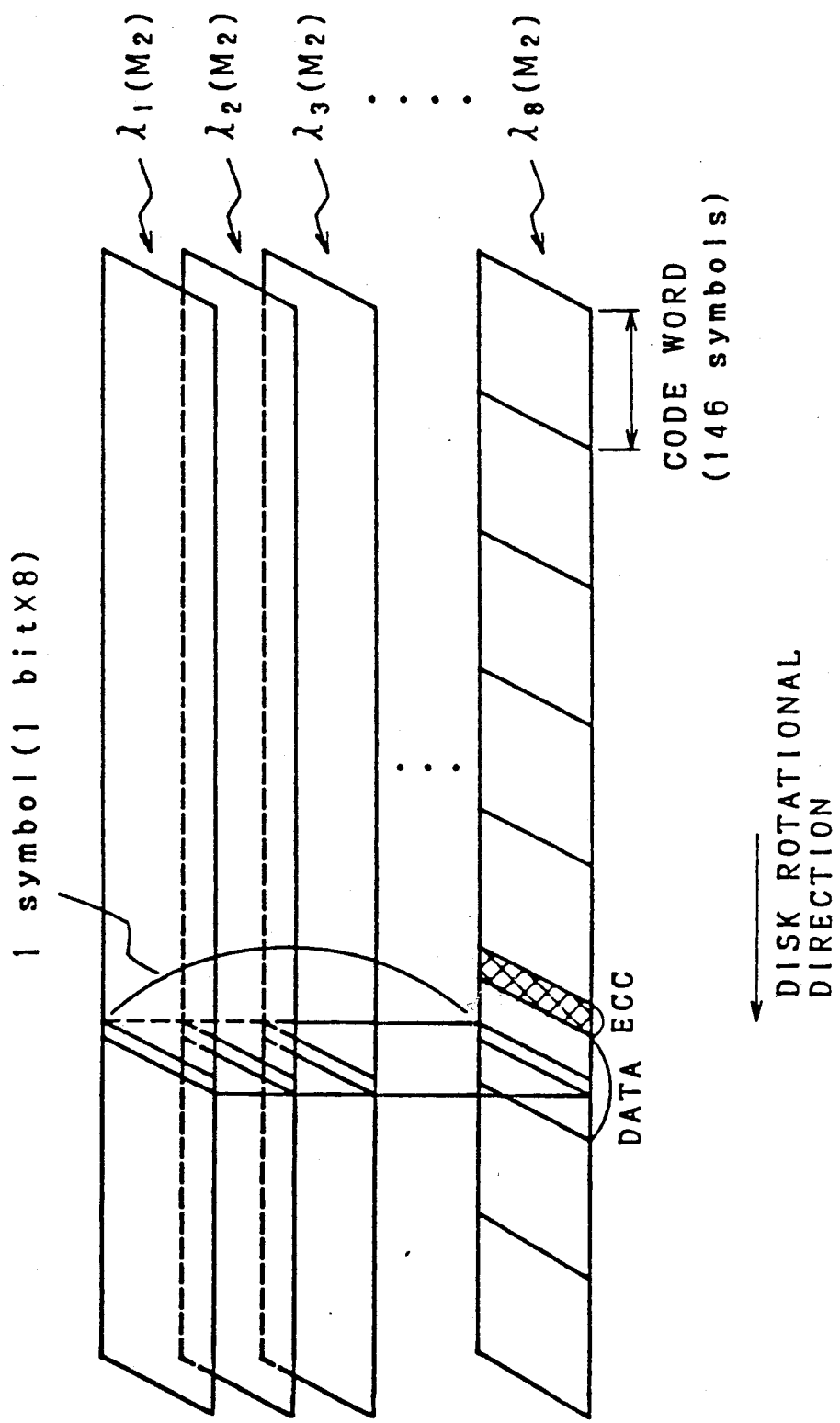
FIG. 16 is a block diagram showing a configuration of a semiconductor laser wavelength controlling circuit.

Also, FIG. 16 is a conceptual view of the case where each error correcting code word is multiple-wavelength-recorded on the record medium sequentially in the direction of a as shown by an arrow in FIG. 15, and eight bits in the directions of wavelengths λ1(M2)–λ8(M2) constitute one-symbol data.

When eight units of error correcting code words are recorded as described above, these are regenerated temporarily, and the error correcting circuit 26 corrects information record error up to eight symbols not agreeing with the predetermined rule in each error correcting code word on the basis of ECC of 16 symbols each regenerated by the error correcting circuit 26, and for example, in this embodiment, correct information is re-recorded in an area for re-recording or the like installed in advance in each recording area recording eight units of error correcting code words.

In addition, in this embodiment, the data processing unit is configurated with eight bits, but the number of bits is not limited to eight.

Next, description is made on a controlling method of the wavelength of light emission of the LD1 in the apparatus of this invention. The LD wavelength controlling circuit 7 controls the oscillation wavelength of the LD1 by varying the injection current into the wavelength controlling system of the LD1, and hereinafter description is made on the operation thereof.

Figure 17:
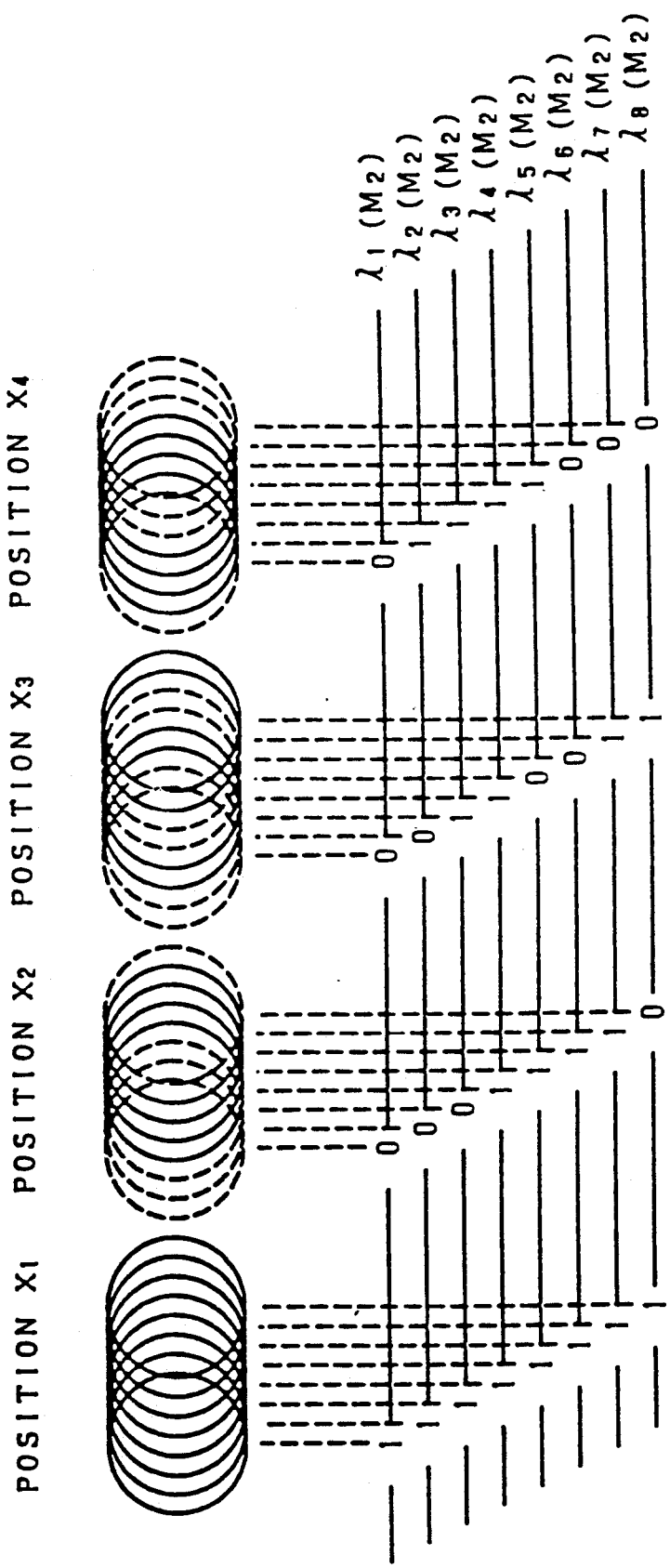
FIG. 17 is a waveform diagram showing operation of controlling the wavelength of a semiconductor laser.

A track is divided into units called sectors in response to the amount of information set to be handed at a time by the system, and the track number and the sector number are recorded in advance (sic) in a header area installed at the head of each sector. The system regenerates information in each header area every time information is recorded or regenerated, and accurately records or regenerates information in an aimed sector of an aimed track. In this embodiment, information for confirming wavelength is recorded in advance in this header area in addition to the track number and the sector number. The information for confirming wavelength is of reference wavelengths to become references of record and regeneration, and the holes as shown in FIG. 17 are formed at data record positions X1, X2, X3 and X4 in the header area to record the data thereof. In FIG. 17, full lines show the pits where the holes are formed, and broken lines show the pits where no holes are formed, and the holes are formed in advance in all of the pits from λ1(M2) to λ8(M2) at the position X1, in the pits from λ4(M2) to λ7(M2) at the position X2, in the pits of λ3(M2), λ4(M2), λ7(M2) and λ8(M2) at the position X3, and in the pits from λ2(M2) to λ5(M2). Accordingly, setting the state that the hole is present to "1" and the state that the hole is absent to "0", information "11111111" is recorded at the position X1, information "00001110" is recorded at the position X2, information "00110011" is recorded at the position X3, and information "01111000" is recorded at the position X4. The information for confirming wavelength as mentioned above is recorded repeatedly many times in one header area, and an area wherein such information for confirming wavelength is called an area for confirming wavelength.

Figure 18:
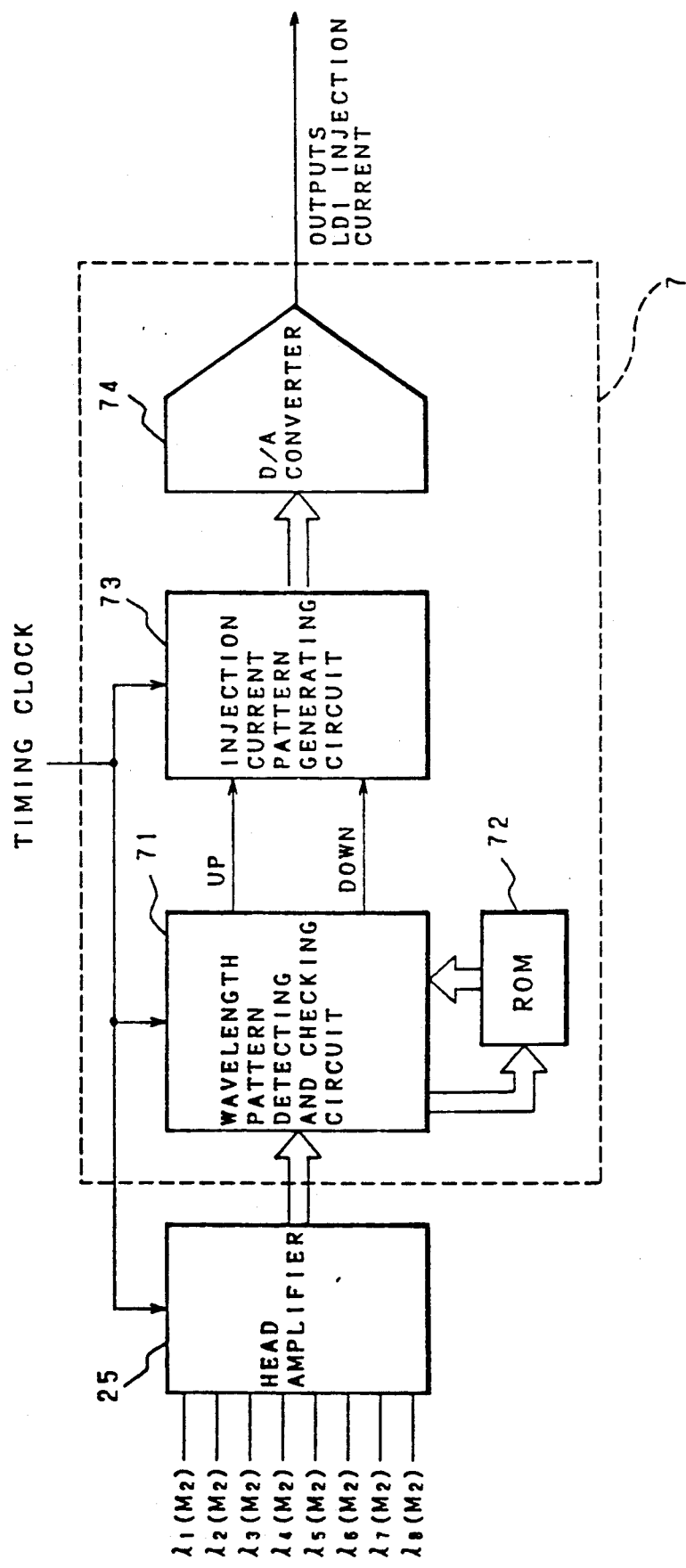

FIG. 18 is a block diagram showing a configuration of the LD wavelength controlling circuit 7. The head amplifier 25 converts an output current of the photo detector corresponding to information for confirming wavelength regenerated from the wavelength confirming area by each wavelength from λ1(M2) to λ8(M2) into a voltage, and outputs it to a wavelength pattern detecting and checking circuit 71 which is a circuit for comparing the above-mentioned wavelengths, and on the basis of this output signal, the wavelength pattern detecting and checking circuit 71 reads the information for confirming wavelength recorded by the reference oscillation wavelength recorded in a ROM 72, and checks the both against each other, and on the basis of the result of the check, gives an UP signal or a DOWN signal increasing or decreasing the injection current to an injection current pattern generating circuit 73 configurating the above-mentioned wavelength equalizing circuit. On the basis of the given UP signal or DOWN signal, the injection current pattern generating circuit 73 outputs a digital signal for increasing or decreasing the injection current being outputted into the wavelength controlling system of the LD1 to a D/A (digital-/analog) converter 74 configurating the above-mentioned wavelength equalizing circuit. The D/A converter 74 converts the given digital signal into an analog value of current, and outputs it to the wavelength controlling system of the LD1.

Next, description is made on the operation thereof using FIG. 19. FIG. 19 (a) shows a pattern of injection current into the wavelength controlling system of the LD1 at clock Tm and an oscillation wavelength of the LD1 at the time when a first and a second information for confirming wavelength in the header area are regenerated. In FIG. 19, the ordinate represents oscillation wavelength λn and the abscissa represents time.

Also, FIG. 19 (c) shows clock pulses outputted to set operational timing of write, read, transfer and the like of each data. In the first regeneration, the oscillation frequency of the LD1 versus clock Tm is such that the LD1 oscillates at λ0(M2) at $T_1$, λ1(M2) at $T_2$, λ2(M2) at $T_3$, $\lambda 3(M2)$ at $T_4$, $\lambda 4(M2)$ at $T_5$, $\lambda 5(M2)$ at $T_6$, $\lambda 6(M2)$ at $T_7$, and $\lambda 7(M2)$ at $T_8$.

On the other hand, the output currents of the photo detectors corresponding to the wavelengths from $\lambda 1(M2)$ to $\lambda 8(M2)$ are converted into voltages by the head amplifier 25, thereafter sent to the LD wavelength controlling circuit 7, and are inputted to the wavelength pattern detecting and checking circuit 71. The wavelength pattern detecting and checking circuit 71 detects the magnitudes of all of the inputted voltages, and when the voltage becomes small, it sets "1" as a result of detection of the hole. This means that at $T_2$ at the position X1, the output current of the photo detector corresponding to the wavelength of $\lambda 1(M2)$ decreases and "1" is set. Similarly, the output currents of the photo detectors corresponding to the wavelengths of $\lambda 2(M2)$, $\lambda 3(M2)$, $\lambda 4(M2)$, $\lambda 5(M2)$, $\lambda 6(M2)$ and $\lambda 7(M2)$ decrease respectively at $T_3$, $T_4$, $T_5$, $T_6$, $T_7$ and $T_8$, and "1" is set respectively. Also, at the position X2, the output currents of the photo detectors corresponding to the wavelengths of $\lambda 4(M2)$, $\lambda 5(M2)$, $\lambda 6(M2)$ and $\lambda 7(M2)$ decrease respectively at $T_5$, $T_6$, $T_7$ and $T_8$, and "1" is set respectively. At the position X3, the output currents of the photo detectors corresponding to the wavelengths of $\lambda 3(M2)$, $\lambda 4(M2)$ and $\lambda 7(M2)$ decrease respectively at $T_4$, $T_5$ and $T_8$, and "1" is set respectively. At the position X4, the output currents of the photo detectors corresponding to the wavelengths of $\lambda 2(M2)$, $\lambda 3(M2)$, $\lambda 4(M2)$ and $\lambda 5(M2)$ decrease respectively at $T_3$, $T_4$, $T_5$ and $T_6$, and "1" is set respectively. FIG. 19 (b) is a table showing the above-mentioned detection patterns, which corresponds to clock Tm shown in FIG. 19 (a). The wavelength pattern detecting and checking circuit 71 obtains the detection patterns of the first information for confirming wavelength at the positions from X1 to X4, and thereafter converts the values at the same clock Tm in the detection patterns at the positions from X1 to X4 into 4-bit codes. This means that "0000" is set at $T_1$, "1000" is set at $T_2$, and "1001" is set at $T_3$. On the other hand, the information for confirming wavelength by means of reference wavelengths as shown in FIG. 17 is stored in advance in a ROM 72 with the time series signals obtained by the same wavelength at the positions from X1 to X4 and the wavelengths thereof used as address and data (in this case, n of the wavelength $\lambda n(M2)$). The wavelength pattern detecting and checking circuit 71 outputs a 4-bit code based on the detection pattern obtained as described above to the ROM 72 as address, reads data from the corresponding address of the ROM 72, and checks the actual oscillation wavelength of the LD1 at each clock Tm against the correct oscillation wavelength. FIG. 19 (d) is a table showing the results of check. Taking the relationship between timing m of clock Tm and n of the wavelength $\lambda n(M2)$ as $m=n+k$, when K is positive as a result of check, the wavelength pattern detecting and checking circuit 71 sends k pulses of UP pulse signal to the injection current pattern generating circuit 73, and when k is negative, it sends k pulses of DOWN pulse signal thereto. In this embodiment, the relationship between m and n is found to be $m=n+1$ as a result of check. Accordingly, as shown in FIG. 14 (e), one pulse of UP pulse signal is sent to the injection current pattern generating circuit 73. The injection current pattern generating circuit 73 receives this UP pulse signal and gives a digital signal for raising the whole of the pattern of step-shaped current injected into the wavelength controlling system of the LD1 by one step to a D/A converter, and on the basis of this digital value, the amount of current to be injected from the wavelength controlling system of the LD1 into the LD1 is corrected. Accordingly, from a second check of information for confirming wavelength, as shown in FIG. 19 (a), timing m of clock Tm agrees with n of the wavelength $\lambda n(M2)$.

In addition, in this embodiment, a step-shaped signal is used for a signal for determining the current injected into the semiconductor laser, but the signal is not limited to this step-shaped signal. A saw tooth wave easily formed as an input signal has a similar effect if it is a periodic signal, because the semiconductor itself has a characteristic of longitudinal mode jump oscillation.

Next, description is made on the operation of erasing information from an aimed track in the state that the condensed light spots of the LD1, LD3 and LD4 track the aimed track of the recording/regenerating layer 52.

Referring to FIG. 3, the LD2 is lit by the LD power controlling circuit 22. The oscillation wavelength of the LD2 belongs to the M3 wavelength band which is an absorption wavelength band of the heat generating layer for erasing 53 in the disc 5. Light projected from the LD2 is converted into parallel light rays by the collimator lens 102, plunging onto the dichroic mirror 112. The dichroic mirror 112 and the dichroic mirror 111 are given a characteristic of reflecting light of the M2 wavelength band, and therefore the light projected from the LD2 is reflected on the dichroic mirror 112, and is further reflected on the dichroic mirror 111, and plunges into the PBS 105 as linearly polarized light having only the P polarized light component to the incident surface of the PBS 105. Accordingly, the light from the LD2 is transmitted through the PBS 105, becomes elliptically polarized light in the quarter-wave plate 106, plunges into the OBL 107, and is condensed onto the disc 5. The optical axis of the LD2 slightly deviates from the LD1, LD3 and LD4 forward in parallel in the rotary direction of the disc, and for the OBL 107, a lens is used whereto aberration compensation capable of neglecting the chromatic aberration thereof in the wavelength bands from the M1 wavelength band to the M4 wavelength band is applied, and therefore the position of condensation of the light from the LD2 precedes on a required track by a slight distance from the positions of condensation of the lights from the LD1, LD3 and LD4. Accordingly, the condensed light spot of the LD2 for heating the heat generating layer for erasing 53 installed closely under the recording/regenerating layer 52 to erase information recorded therein, also tracks the required track of the recording/regenerating layer 52.

When the LD2 is lit, almost all of light energy is absorbed in the heat generating layer for erasing 53, being converted into heat energy. Since the heat generating layer for erasing 53 is installed closely to the recording/regenerating layer 52, heat generated in the heat generating layer for erasing 53 diffuses immediately, and raises the temperature of the corresponding pit of the recording/regenerating layer 52 up to a temperature required for erasing the hole thereof. The holes of the recording/regenerating layer 52 can be held without being broken up to the normal storage temperature, for example, 100° C., but the holes have a characteristic of being erased by heat energy at temperatures above 100° C. In this case, by selecting most suitably the heat resistance of the heat generating layer for erasing 53 and the power of the LD2, the range of thermal diffusion is narrowed and only the holes of the required track can be erased without erasing the holes of the adjacent tracks. Also, by synchronizing the period of light emission of the LD2 with the servo frequency regenerated from the disc 5, information can also be erased on a required unit basis, for example, on a one-byte basis. Furthermore, the condensed light spot for erasing of the LD2 always precedes the condensed light spot for record and regeneration of the LD1 on the track, and therefore by selecting most suitably the distance between the spots and the heat resistance of the recording/regenerating layer 52, the over-light is made possible that information continues to be recorded by the condensed light spot for record and regeneration of the LD1 while erased by the condensed light spot for erasing of the LD2.

In addition, in this embodiment, for the shutter installed in the cartridge 32, the liquid crystal shutter 35 is used, but a mechanical shutter may be used, and in this case a current is supplied from the power source.

Also, in this embodiment, the cooler 33 is attached to the cartridge 32, and the radiator 34 is loaded when used, but a similar effect is obtainable also by an integral configuration of the cooler 33 and the radiator 34, and further by a configuration that these are loaded when using the recording medium, a similar effect is also obtainable and the weight of the recording medium can be made lighter.

Also, in this embodiment, a configuration is adopted that a material causing the PHB phenomenon at a wavelength band different from that of the recording-/regenerating layer is used for the first auxiliary layer for tracking, and the pits for tracking to be recorded at the positions facing each other across the pits for record are recorded by different wavelengths respectively, but the configuration is not limited to this. The respective pits for tracking are recorded in advance by the same wavelength, and taking the amplitudes of regeneration signals from the both pits as $V_A$ and $V_B$, the objective lens is driven in the direction perpendicular to (the direction of) the optical axis so that $(V_A-V_B)/(V_A+V_B)=O$ holds, and thereby the condensed light spot follows the track.

In addition, when adopting a means of driving the condensed light spot in the direction perpendicular to the optical axis, the objective lens is not necessarily required to be driven.

Further, a similar effect is obtainable also by recording the pits for tracking on the recording/regenerating layer by a wavelength different from the wavelength for record and regeneration.

Also, in the case of recording information for tracking on the first auxiliary layer using a material causing the PHB phenomenon in the same wavelength band for the recording/regenerating layer and the first auxiliary layer recording or information for tracking on the recording/regenerating layer as described above, the wavelength region used in the same wavelength band may be separated.

Furthermore, in this embodiment, materials having different wavelength bands causing the PHB phenomenon respectively are laminated for the first auxiliary layer, the recording/regenerating layer and the second auxiliary layer, but materials having the same wavelength band causing the PHB phenomenon may be used for the first auxiliary layer and the second auxiliary layer, and the pit string for detecting servo frequency be recorded by the lights of different wavelengths. Also, the lights having different wavelengths may be used for pit string record and information record using materials having the same wavelength band for all of the three layers.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A frequency selective optical data record/regenerate apparatus comprising;
   a recording medium which records and regenerates information utilizing a photochemical hole burning effect;
   a light source wherein the wavelength of a light beam irradiated onto said recording medium varies sequentially to a plurality of wavelengths,
   a means for fixing the wavelength of light beam irradiated from said light source onto the recording medium to a required wavelength, and
   a means for synchronizing the timing of said information with the timing of sequential changes in the wavelength of the light beam irradiated from said light source.

2. A frequency selective optical data record/regenerate apparatus in accordance with claim 1, wherein said information recording/regenerating means records the holes formed by the light beam of the same wavelength apart from each other by a distance capable of avoiding interference, while multiple-records the holes formed by the light beam of different wavelengths on nearly the same position of the recording medium yet displacing each position by a predetermined distance, and comprises a means for regenerating multiple-recorded information and a means for driving the light source in response to the position at which information is multiple-recorded or -regenerated.

3. A frequency selective optical data record/regenerate apparatus in accordance with claim 1, wherein said light source consists of a wavelength-variable semiconductor laser.

4. A frequency selective optical data record/regenerate apparatus in accordance with claim 3, wherein said wavelength-variable semiconductor laser varies the wavelength of the oscillating light beam by a longitudinal mode jump generated responding to the amount of current injected.

5. A frequency selective optical data record/regenerate apparatus in accordance with claim 1, wherein said light source oscillates a light beam having wavelengths of a plurality of different wavelength bands.

6. A frequency selective optical data record/regenerate apparatus in accordance with claim 1, wherein said information recording/regenerating means consists of a means for adding error correcting codes to information and recording them in a recording medium along with the information and a means for regenerating information whereto the error correcting codes are added and correcting the recorded information on the basis of the added error correcting codes.

7. A frequency selective optical data record/regenerate apparatus in accordance with claim 1, wherein said optical system consists of an optical element leading a light beam oscillated from a light source in a predetermined direction responding to the wavelength, and a light condensing element condensing the light beam led in the predetermined direction by said optical element onto a recording medium.

8. A frequency selective optical data record/regenerate apparatus in accordance with claim 1, wherein said recording medium is capable of forming optical holes at absorption spectra by light beams having wavelengths belonging to a plurality of different wavelength bands.

9. A frequency selective optical data record/regenerate apparatus in accordance with claim 1, wherein said recording medium formed optical holes at absorption spectra by the light beams having wavelengths belonging to a plurality of different wavelength bands respectively.

10. A frequency selective optical data record/regenerate apparatus in accordance with claim 1, wherein said recording medium is provided with a reflecting body reflecting the irradiated light beam to the light source side.

11. A frequency selective optical data record/regenerate apparatus in accordance with claim 1, wherein said detecting system consists of a diffracting and dispersing element diffracting and dispersing the light beams in response to the wavelength and a group of detecting elements detecting the diffracted and dispersed light beams separately and respectively.

12. A frequency selective optical data record/regenerate apparatus in accordance with claim 1, wherein said detecting system and said light source are disposed on the same side of the recording medium.

13. A frequency selective optical data record/regenerate apparatus in accordance with claim 1, wherein predetermined information is recorded on the recording medium by a light beam having a reference wavelength to be irradiated.

14. A frequency selective optical data record/regenerate apparatus in accordance with claim 13, wherein said wavelength fixing means consists of a means for comparing said predetermined information regenerated by the irradiating light beam with said predetermined information regenerated by said light beam having a reference wavelength, and a means for making the wavelength of the irradiating light beam coincide with the reference wavelength on the basis of the result of comparison.

15. A frequency selective optical data record/regenerate apparatus in accordance with claim 1, wherein said recording medium is housed in a case having the light shielding property and the adiabatic property.

16. A frequency selective optical data record/regenerate apparatus in accordance with claim 1, wherein position identifying information identifying the position where information is to be recorded, regenerated or erased, is recorded in the recording medium.

17. A frequency selective optical data record/regenerate apparatus in accordance with claim 16, wherein said position identifying information is recorded in a layered recording medium at positions facing each other across the layers, the layers having a configuration where information to be recorded, regenerated or erased is located at a middle position between layers for tracking.

18. A frequency selective optical data record/regenerate apparatus in accordance with claim 1, wherein said information recording/regenerating means comprises a means for generating clock on the basis of the position identifying information and rotational number of the recording medium wherein said position identifying information is recorded and a means for recording, regenerating or erasing information in response to said clock.

19. A frequency selective optical data record/regenerate apparatus in accordance with claim 1, wherein said recording medium is provided with a heat generating body which is heated to a predetermined temperature or higher capable of erasing the recorded holes by an erasing light beam having a predetermined wavelength corresponding to the record position of information.

20. A frequency selective optical data record/regenerate apparatus in accordance with claim 19, wherein said erasing light beam selectively heats the heat generating body at the position corresponding to the record position of required information.

21. A frequency selective optical data record/regenerate apparatus in accordance with claim 19, wherein said erasing light beam irradiates the recording medium while preceding the light beam for recording information.

22. A frequency selective optical data record/regenerate apparatus comprising:
a recording medium which records and regenerates information utilizing a photochemical hole burning effect;
a light source wherein the wavelength of a light beam irradiated onto said recording medium varies sequentially; and
a means for fixing the wavelength of light of said light beam onto the recording medium to a specified wavelength.

23. A frequency selective optical data record/regenerate apparatus which irradiates a light beam of a predetermined wavelength band onto a recording medium through an optical system comprising;
a light source wherein the wavelength of a light beam irradiated onto said recording medium varies sequentially;
a means for fixing the wavelength of light irradiated from said light source onto the recording medium to a specified wavelength; and
a means for synchronizing the timing of said information with the timing of sequential changes in the wavelength of the light beam irradiated from said light source.

* * * * *